US010675721B2

(12) United States Patent
Weinberg

(10) Patent No.: US 10,675,721 B2
(45) Date of Patent: Jun. 9, 2020

(54) ADJUSTABLE TEMPLATES FOR PIPE CUTTING FRAMES

(71) Applicant: Illinois Tool Works Inc., Glenview, IL (US)

(72) Inventor: Jeremy Edward Weinberg, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 217 days.

(21) Appl. No.: 15/828,361

(22) Filed: Nov. 30, 2017

(65) Prior Publication Data

US 2019/0160604 A1 May 30, 2019

(51) Int. Cl.
| | |
|---|---|
| *B23K 37/02* | (2006.01) |
| *B23B 5/16* | (2006.01) |
| *B23D 21/04* | (2006.01) |
| *B23B 5/08* | (2006.01) |
| *B23B 3/26* | (2006.01) |

(Continued)

(52) U.S. Cl.
CPC ............ *B23K 37/0276* (2013.01); *B23B 3/26* (2013.01); *B23B 5/08* (2013.01); *B23B 5/163* (2013.01); *B23D 21/04* (2013.01); *B23K 37/0217* (2013.01); *B23K 37/0288* (2013.01);
(Continued)

(58) Field of Classification Search
CPC .... B23B 3/22; B23B 3/24; B23B 3/26; B23B 3/265; B23K 37/02; B23K 37/0211; B23K 37/0229; B23K 37/0276; B23K 37/0288
See application file for complete search history.

(56) References Cited

U.S. PATENT DOCUMENTS 1,407,419 A * 2/1922 Husted .................. B23Q 35/44
82/11.1
2,341,418 A * 2/1944 Atkins .................... B23B 47/28
33/578
(Continued)

FOREIGN PATENT DOCUMENTS

DE 2849195 5/1980

OTHER PUBLICATIONS

Int'l Search Report and Written Opinion Appln No. PCT/US2018/063313 dated Mar. 19, 2019 (15 pgs).
(Continued)

*Primary Examiner* — Jason Daniel Prone
*Assistant Examiner* — Richard D Crosby, Jr.
(74) *Attorney, Agent, or Firm* — McAndrews, Held & Malloy, Ltd.

(57) ABSTRACT

Example split frame pipe cutting tools include a frame and a slide tool configured to position a cutting edge in contact with the workpiece to performing cutting or boring on the workpiece, the slide tool comprising: a radial advancement mechanism configured to provide radial advancement of the cutting edge based on circumferential advancement of the slide tool by the frame; and an axial guide rail; a recirculating bearing carriage configured to slide in an axial direction along the axial guide rail and to couple the cutting edge to the axial guide rail; an axial advancement mechanism configured to advance the cutting edge in the axial direction with respect to the workpiece by translating radial advancement by the radial advancement mechanism to axial advancement based on a cutting template coupled to the radial advancement mechanism.

20 Claims, 22 Drawing Sheets

(51) Int. Cl.
*B26D 3/16* (2006.01)
*B23D 21/00* (2006.01)

(52) U.S. Cl.
CPC .......... *B26D 3/166* (2013.01); *B23B 2215/72* (2013.01); *B23D 21/00* (2013.01); *B26D 3/16* (2013.01)

(56) References Cited

U.S. PATENT DOCUMENTS

| | | | | |
|---|---|---|---|---|
| 2,861,608 | A | | 11/1958 | Brown |
| 3,146,675 | A | * | 9/1964 | Anderson ............... B23B 51/05 409/179 |
| 3,148,562 | A | * | 9/1964 | Moss ...................... B23B 47/28 408/75 |
| 3,674,376 | A | * | 7/1972 | Silken ................... B23B 47/288 408/115 R |
| 3,972,251 | A | * | 8/1976 | Gorman ................. B23Q 35/44 82/11.1 |
| 4,330,228 | A | * | 5/1982 | Beyl ....................... A63C 11/26 408/112 |
| 4,483,071 | A | * | 11/1984 | te Kolste ............. B23Q 1/4804 30/376 |
| 4,759,666 | A | * | 7/1988 | Grab ....................... B23B 47/28 408/115 B |
| 4,813,314 | A | | 3/1989 | Kwech |
| 5,035,061 | A | * | 7/1991 | Bradbury ............. B23Q 9/0028 30/373 |
| 5,189,933 | A | | 3/1993 | Ricci |
| D352,510 | S | * | 11/1994 | Sutton .......................... D15/138 |
| 5,529,442 | A | * | 6/1996 | Jorgensen ............... B23G 1/24 408/203 |
| 5,895,183 | A | * | 4/1999 | McDaniel ............... B23B 51/05 30/300 |
| 6,256,899 | B1 | * | 7/2001 | McGhee ............... B23Q 9/0042 33/628 |
| 6,574,873 | B2 | * | 6/2003 | Kordyak ................ B23D 59/00 30/310 |
| 7,043,845 | B2 | * | 5/2006 | Lukens ...................... B27B 9/04 30/370 |
| 7,229,237 | B1 | * | 6/2007 | Fulgham ............... B23B 47/284 408/115 R |
| 7,270,505 | B2 | * | 9/2007 | VanderPol ............. B23C 3/122 105/29.1 |
| 9,132,487 | B2 | * | 9/2015 | Beydler ................ B23B 49/026 |
| 9,233,464 | B2 | * | 1/2016 | Sherman ............... B25H 1/0078 |
| 9,782,838 | B2 | * | 10/2017 | Pedersen ............... B23B 49/026 |
| 2005/0247171 | A1 | * | 11/2005 | Kawashima ............... B23B 3/26 82/113 |
| 2006/0207395 | A1 | | 9/2006 | Place |
| 2015/0096421 | A1 | | 4/2015 | Pierce |
| 2015/0378126 | A1 | * | 12/2015 | Migenes .............. G02B 6/4497 83/874 |
| 2018/0133814 | A1 | * | 5/2018 | Pierce ..................... B26D 5/22 |

OTHER PUBLICATIONS

Int'l Search Report and Written Opinion Appln No. PCT/US2017/061040 dated Feb. 5, 2017 (17 pgs).
Non-Final Office Action U.S. Appl. No. 15/809,186 dated Apr. 28, 2018.
Response to Non-Final Office Action U.S. Appl. No. 15/809,186 filed Nov. 30, 2018.
Final Office Action U.S. Appl. No. 15/809,186 dated Mar. 6, 2019.

* cited by examiner

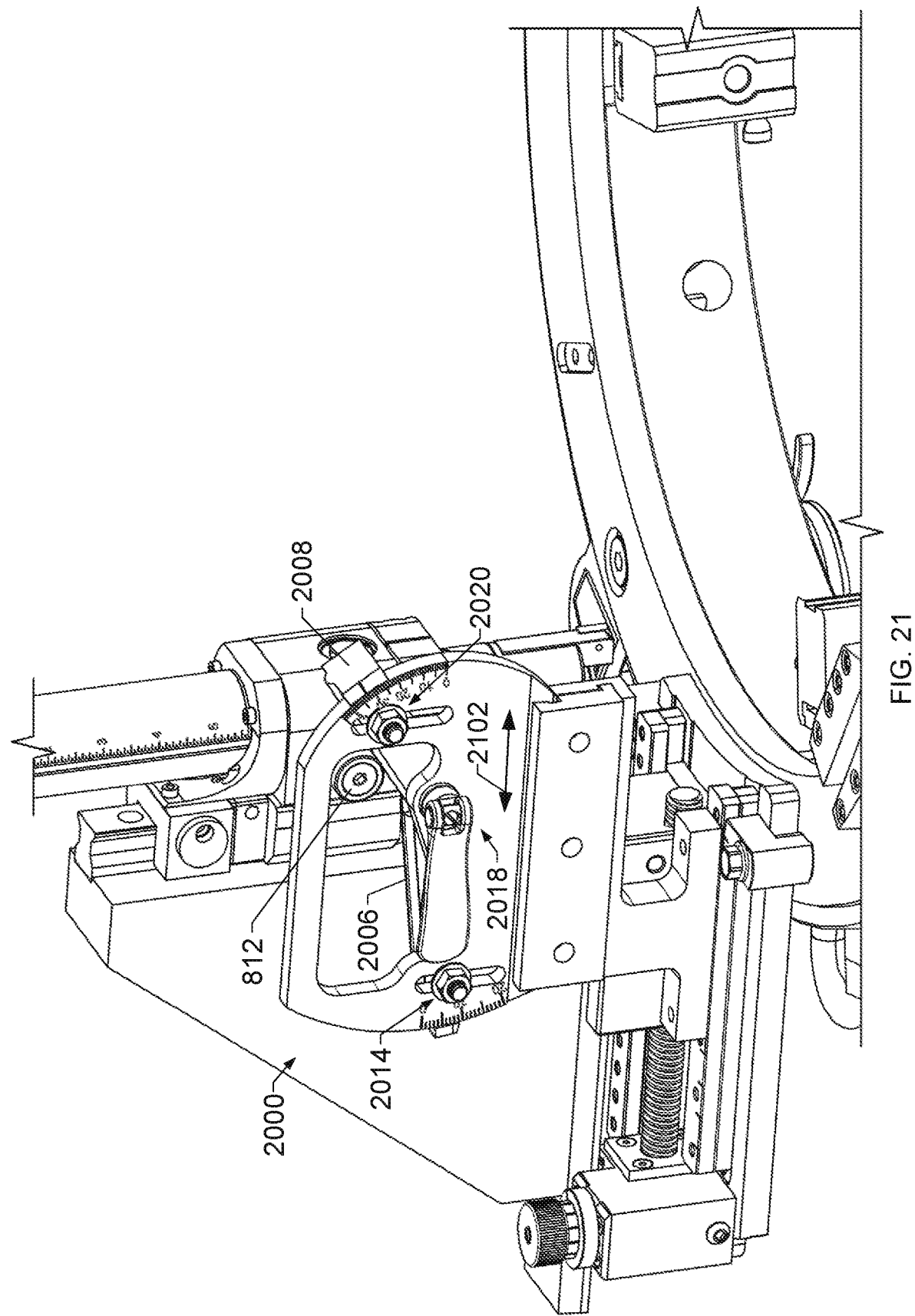

ADJUSTABLE TEMPLATES FOR PIPE CUTTING FRAMES

BACKGROUND

This disclosure relates generally to orbital cutting and, more particularly, to adjustable templates for pipe cutting frames.

A variety of different types of pipe machining apparatuses exist to perform various machining processes on pipes, such as, for example, cutting pipes. One example of such pipe machining apparatuses includes a split frame pipe machining apparatus, which includes two or more frame members that surround the pipe from respective sides and couple together around the pipe. Such a pipe cutter includes a tool or cutting device that encircles the pipe and moves toward the pipe in small increments during the cutting process in order to slowly cut into the pipe. The tool is supported by a tool support. Eventually, after many small increments of adjustment toward the pipe, the pipe will be completely cut by the tool.

SUMMARY

Adjustable templates for pipe cutting frames are disclosed, substantially as illustrated by and described in connection with at least one of the figures, as set forth more completely in the claims.

Figure 2:
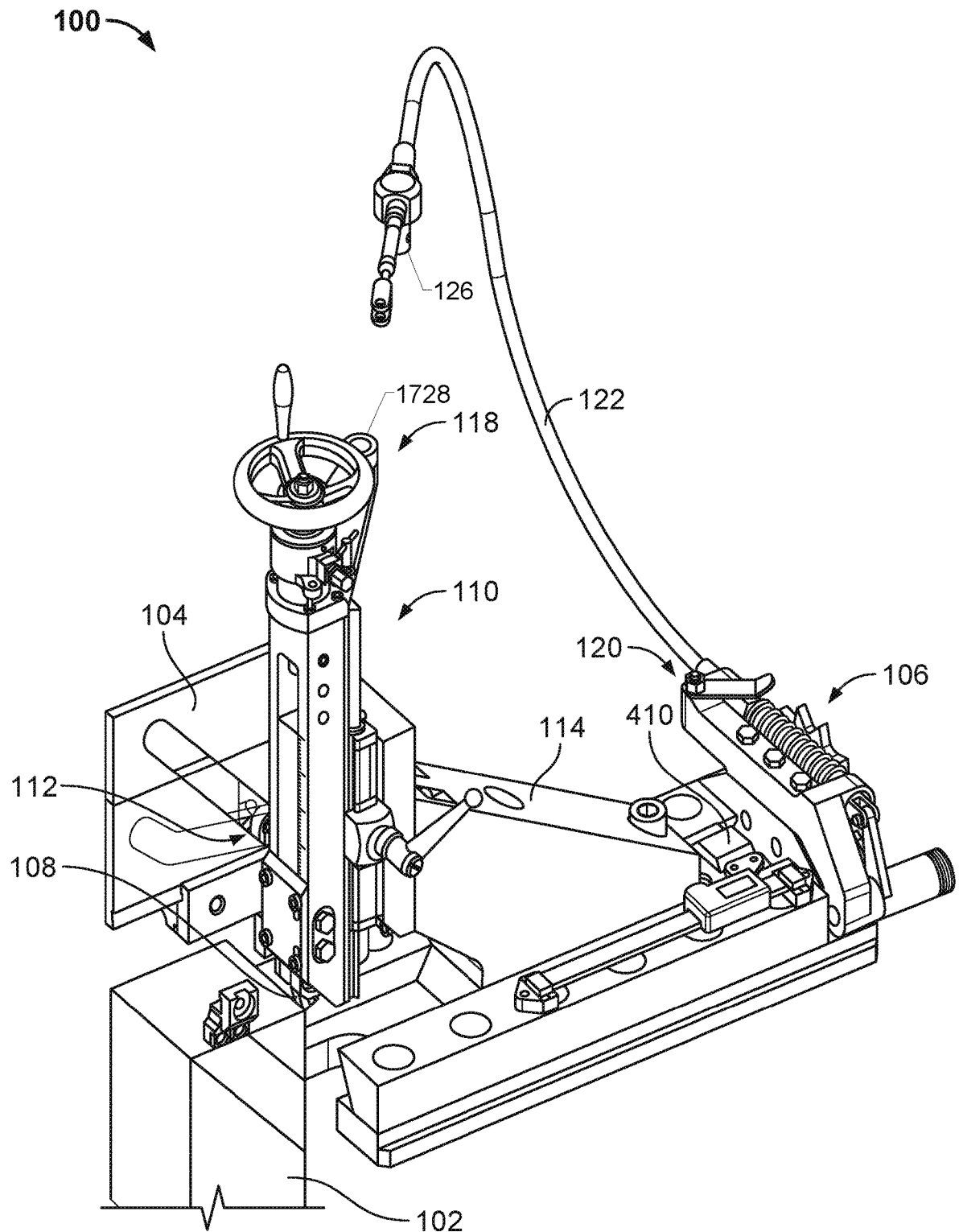
FIG. 2 is a perspective view of an example implementation of the slide tool of FIG. 1 and a portion of a pipe to be machined with the slide tool.
Figure 20A:
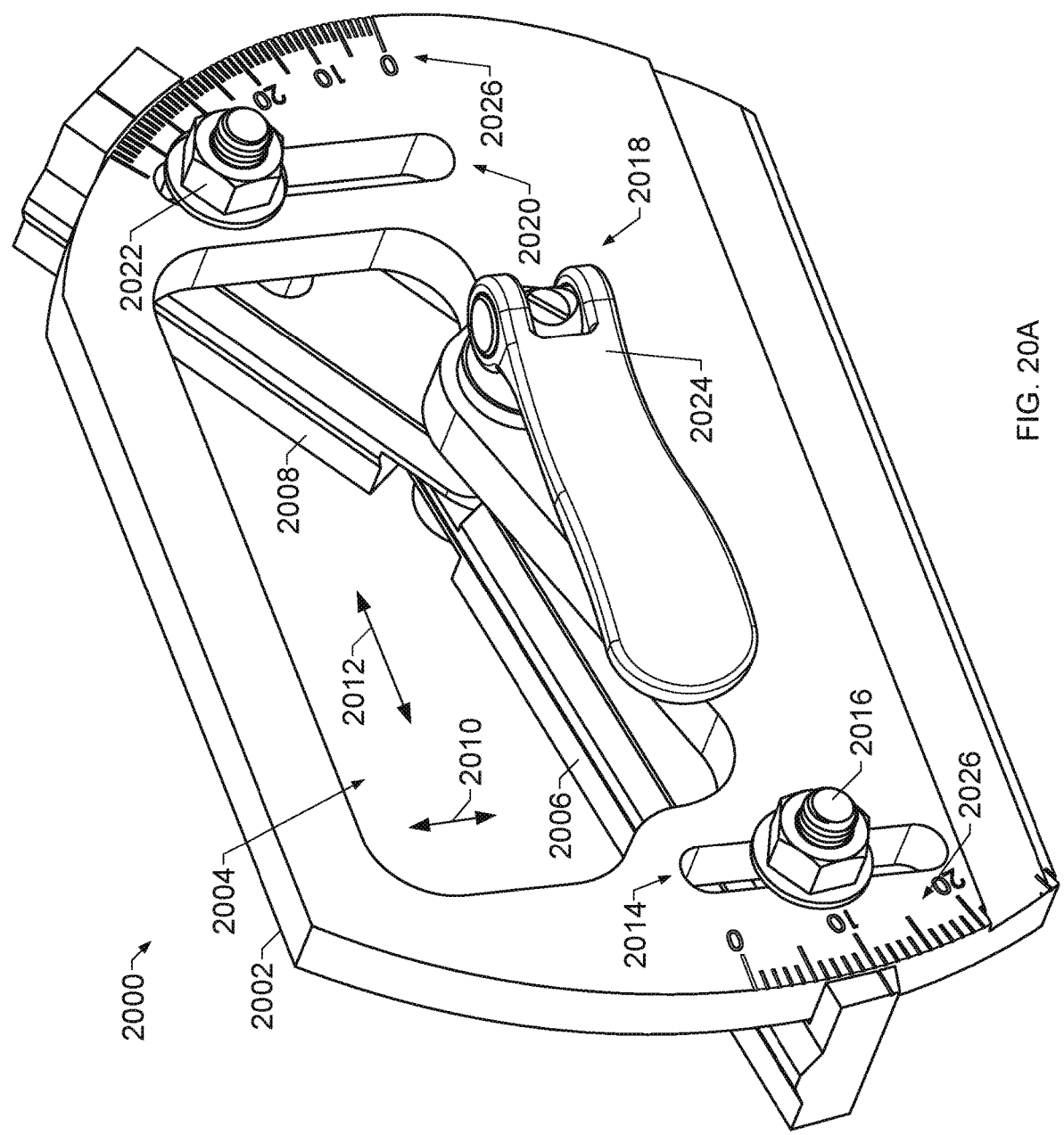
FIGS. 20A and 20B illustrate an example cutting template that may be used to implement the template of FIG. 2.
Figure 20B:
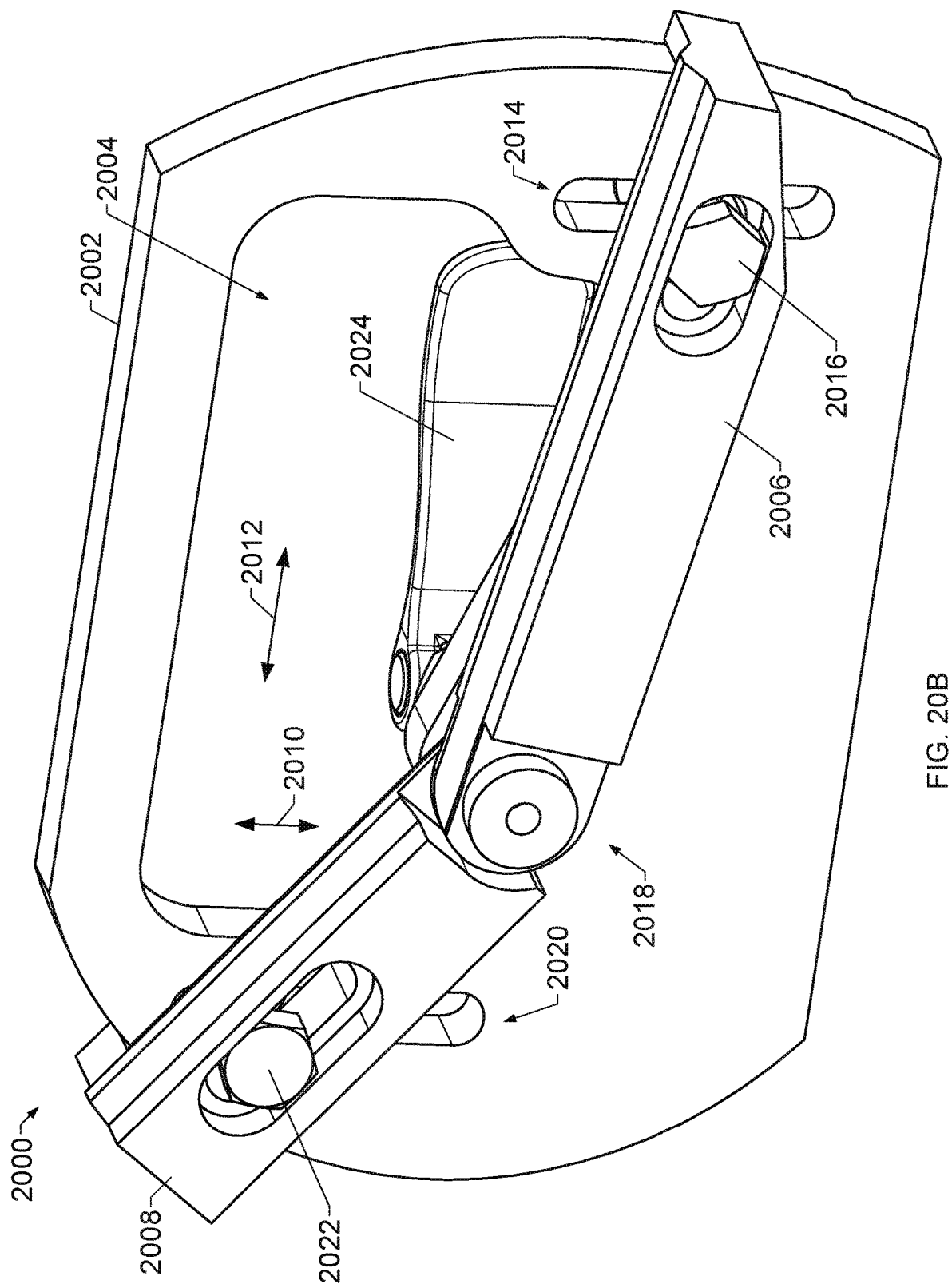

21 illustrates the example cutting template of FIGS. 20A and 20B installed on the example cutting tool of FIG. 2.

The figures are not necessarily to scale. Similar or identical reference numerals may be used to refer to similar or identical components.

DETAILED DESCRIPTION

Conventional templates for cutting tools must be manufactured with the exact angle or combination of angles needed for a particular workpiece. Use of conventional fixed templates increases the template inventory required to cover all desired angle combinations that may be needed on a particular work site. The use of conventional fixed templates increases the probability that the user could lack a template having the desired angle combination and increases the cost and/or work delays to procure the proper template.

Disclosed example split frame pipe cutting tools include adjustable templates that permit a range of bevel angles or profiles to be machined into a workpiece using the same template. Thus, example adjustable templates may be used to provide substantially any number of bevel angles and/or compound bevels within the angle range of the adjustable template. In some examples, an adjustable cutting template includes a frame plate, a first template link coupled to the frame at a first joint; and a second template link coupled to the first template link at a second joint. The first and second template links and the first and second joints are adjustable to modify a template path and securable to fix the template path. Disclosed example cutting tools include a radial advancement mechanism that provides radial advancement of a cutting edge based on circumferential advancement of a slide tool by a frame, and an axial advancement mechanism to advance the cutting edge in an axial direction with respect to the workpiece by translating radial advancement by the radial advancement mechanism to axial advancement based on the template path in the cutting template.

As used herein, the terms "axial" and "radial" are used with reference to a pipe or other workpiece being worked upon by disclosed examples. For example, references to an axial direction mean in the axial direction of the pipe or other workpiece (e.g., along the axis of the pipe or other workpiece). Similarly, references to a radial direction mean the radial direction of the pipe or other workpiece (e.g., toward or away from the axis of the pipe or other workpiece).

Figure 1:
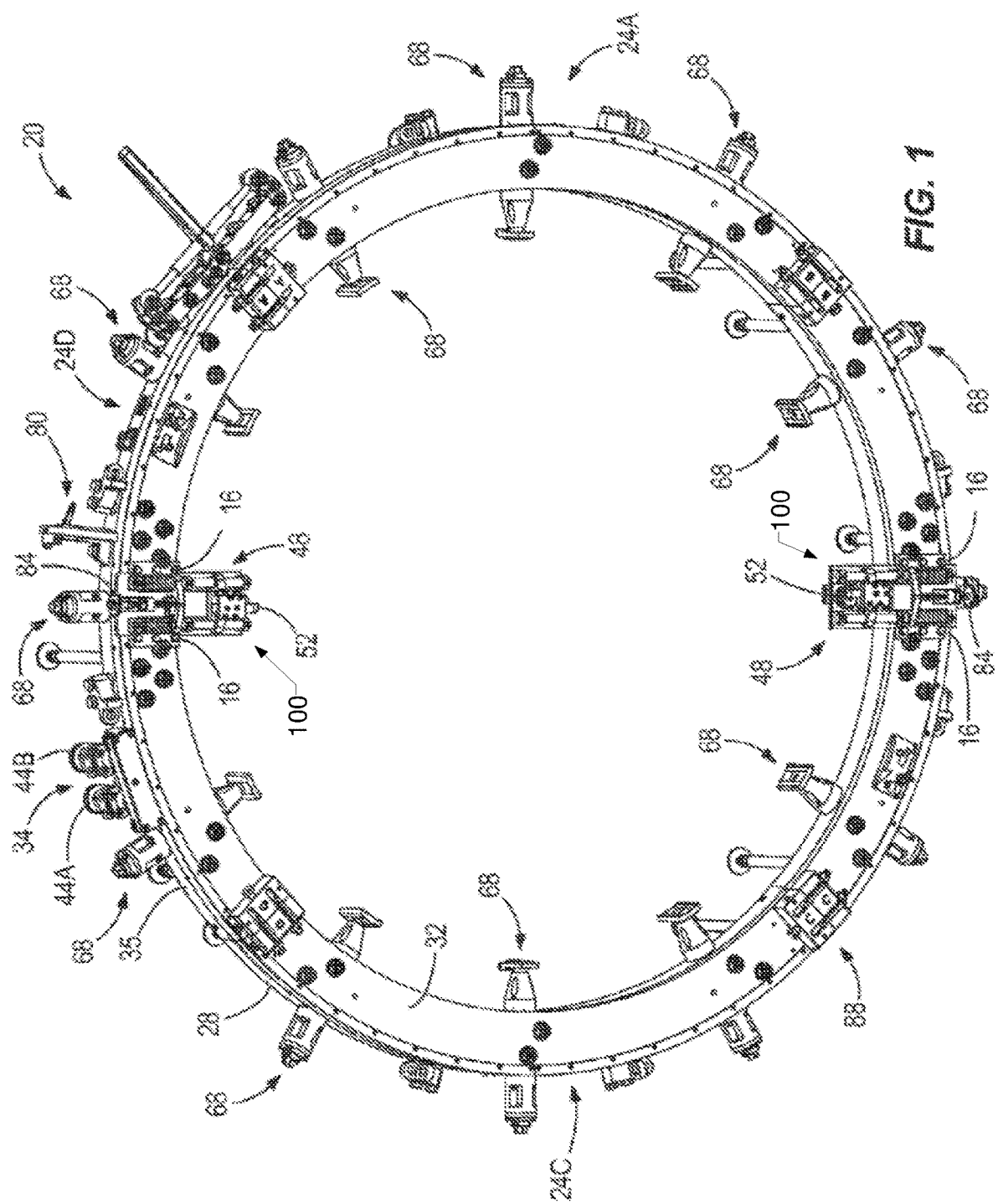
FIG. 1 is a perspective view of one example of a pipe machining apparatus to support one or more slide tools, in accordance with aspects of this disclosure.

With reference to FIG. 1, one example of a pipe machining apparatus 20 adapted to machine pipes of varying diameters is illustrated. This example of a pipe machining apparatus 20 is configured to include the tool support 48 shown in FIGS. 2 and 3. In some exemplary embodiments, the apparatus 20 completely cuts through pipes 22. In other exemplary embodiments, the apparatus 20 prepares an end of a pipe for coupling to another pipe. In still other exemplary embodiments, the apparatus 20 both completely cuts and prepares a pipe for coupling to another pipe. The illustrated example of a pipe machining apparatus 20 is only one type of a wide variety of pipe machining apparatuses that may employ the features of the present disclosure and the illustrated example is not intended to limit the present disclosure in any manner.

In the illustrated example, pipe machining apparatus 20 is formed of four joined-together sections 24A, 24B, 24C, 24D and includes a frame 28 and a tool carrier 32. The four joined together sections 24A, 24B, 24C, 24D encircle the pipe 22 and together comprise the frame 28 and the tool carrier 32. A drive mechanism 34 is coupled to a periphery 35 of the frame 28. In the illustrated example, the drive mechanism 34 includes a pair of drive motors 44A, 44B such as, for example, an air and/or hydraulic motor with suitable gear reduction means. In other examples, the drive mechanism 34 may be comprised of other quantities of motors or other types of drive mechanisms. The frame 28 is adapted to couple and be fixed relative to a pipe, and the tool carrier 32 is rotatable relative to the fixed frame 28 and the pipe. The drive mechanism 34 is adapted to rotate the tool carrier 32 relative to the frame 28 through a gear train. In this example manner, the tool carrier 32 provides circumferential advancement to one or more cutting tools around the pipe 22.

Figure 3:
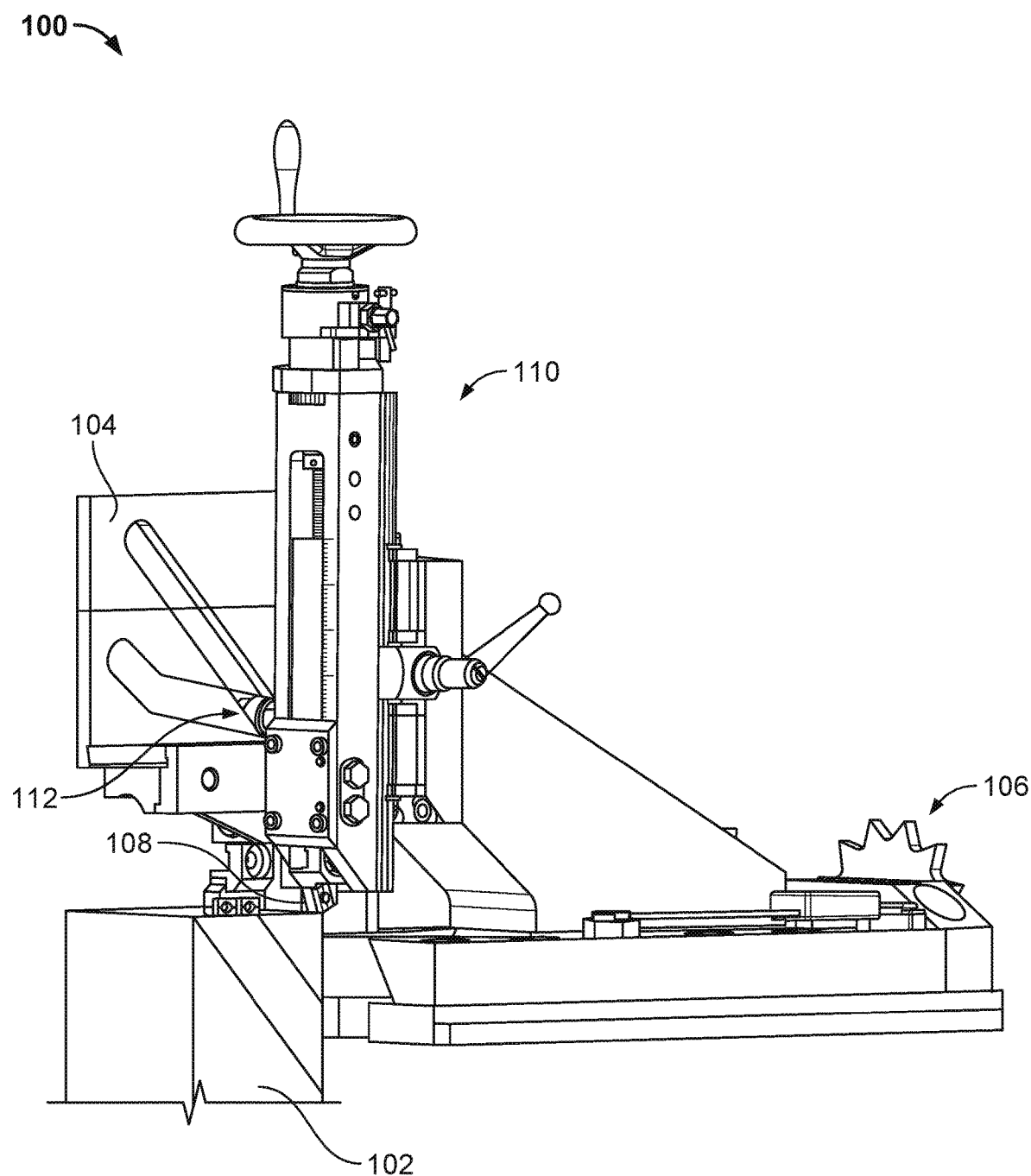
FIG. 3 is another perspective view of the example slide tool of FIG. 2 and the portion of the pipe.

The rotatable tool carrier 32 includes one or more tool supports 48 (two tool supports 48 shown in the illustrated example), which support tools 52 for performing a cutting or machining operation on the pipe as the tools 52 rotate circumferentially about the pipe 22. Both tool supports 48 illustrated in FIG. 1 are the same type of tool support and are one example of many different types of tool supports of the present disclosure. The tool support 48 illustrated in FIGS. 2 and 3 is mountable to the pipe machining apparatus 20 in a similar location and in a similar manner to the example illustrated in FIG. 1. The tool supports 48 are coupled to the tool carrier 32 by a plurality of fasteners 16. The machining operation performed by the tool(s) 52 may form a straight edge substantially perpendicular to a longitudinal extent of the pipe 22, a bevel on an end of the pipe 22 that is transverse to and at an angle other than ninety-degrees to the longitudinal extent of the pipe 22, or an edge of a pipe 22 having any angle. Such a bevel may be formed on either an inner surface of the pipe 22 or an outer surface of the pipe 22.

The apparatus 20 further includes a plurality of coupling members 68 engageable with an exterior of the pipe 22 and having suitable adjustability to couple and concentrically or axially locate the apparatus 20 to the exterior of the pipe 22. The coupling members 68 are also positionable on the apparatus 20 to engage an interior of the pipe 22 and are suitably adjustable to couple and concentrically or axially locate the apparatus 20 to the interior of the pipe 22.

Tool carrier 32 is rotatably mounted on and supported by frame 28 by a plurality of roller bearings positioned between the frame 28 and the tool carrier 32. The roller bearings ride in a circular bearing race on the interior of tool carrier 32.

The apparatus 20 also includes a bidirectional radial advancement mechanism 80 that is adjustable into and out of a path of an advancement member 84 coupled to each tool support 48 to advance the tool 52 toward the pipe 22.

FIG. 2 is a perspective view of an example implementation of the slide tool 100 of FIG. 1 and a portion of a pipe 102 to be machined with the slide tool 100. FIG. 3 is another perspective view of the example slide tool 100 and the portion of the pipe 102. In contrast with conventional slide tools, the example slide tool 100 is configurable to perform pipe facing, outer diameter surfacing, inner diameter surfacing, and/or cutting or boring of the pipe 102 by different configurations of the slide tool 100 and/or the use of different cutting tips. The apparatus 20 may support one or more of the slide tools 100, where additional slide tools increase the speed of processing the pipe 102.

The slide tool 100 may be supported on the tool support 48 of FIG. 1 to position a cutting tip 108 having a cutting edge in contact with a workpiece (e.g., the pipe 22) to perform cutting or boring on the workpiece for radial movement of a cutting tip 108. The example slide tool 100 is capable of bidirectional radial tracking and bidirectional axial tracking. The slide tool 100 may form cuts having different profiles using one or more templates 104. The example slide tool 100 improves on conventional tools in that the slide tool 100: 1) is modular and can be mounted on slide base for multiple machining platforms; 2) is lighter weight; 3) has a capability for automatic axial feeding in addition to automatic radial feeding; 4) has a capability to reverse feed directions in both axial feeding and radial feeding; 5) has a spring-loaded drag system that offers superior performance over conventional cutting tools, and 6) increases cutting speeds by increasing the cut depth. In some examples, the slide tool 100 has axial and/or radial cutting ranges that enable the cutting tip 108 to perform cutting all the way to the clamping feet of the frame 28 that hold the frame 28 onto the pipe 102. These and other advantages will be described in more detail below.

The example slide tool 100 includes an automatic radial advancement mechanism 106 to provide bidirectional radial advancement of the cutting tip 108 based on circumferential advancement of the slide tool 100 (e.g., by the tool carrier 32). The example slide tool 100 also includes an axial advancement mechanism 110 to provide bidirectional axial advancement of the cutting tip 108. The radial advancement mechanism 106 is triggered to feed the cutting tip 108 in the radial direction by interaction between the radial advancement mechanism 106 and one or more advancement points around the circumference of the frame 28. Similarly, the axial advancement mechanism 110 may be triggered by an axial feed mechanism 116 to feed the cutting tip 108 in the axial direction by interaction between the axial advancement mechanism 110 and the one or more advancement points around the circumference of the frame 28 and/or may advance the cutting tip 108 in the axial direction with respect to the workpiece by translating radial advancement by the radial advancement mechanism 106 to axial advancement based on the cutting template 104 coupled to the radial advancement mechanism 106.

The example axial feed mechanism 116, discussed in more detail below, advances the axial advancement mechanism 106 based on the circumferential advancement of the slide tool 100 by the tool carrier 32. The axial feed mechanism 116 may be enabled or disabled based on the desired cutting operation (e.g., disabled when the template 104 is used).

The example slide tool 100 includes a cam follower 112 coupled to the axial advancement mechanism 110 that causes axial movement in the cutting tip 108 in response to radial movement of the cutting tip by the radial advancement mechanism 106. The axial movement in the cutting tip 108 relative to the radial movement caused by the radial advancement mechanism 106 is determined using the template 104. The template 104 may cause the cutting tip 108 to machine, into the workpiece, a straight edge substantially perpendicular to a longitudinal extent of the workpiece. The template 104 may alternatively cause the cutting tip 108 to machine a bevel on an inner surface of an end of the workpiece that is transverse to and at one or more angles other than ninety-degrees, to the longitudinal extent of the workpiece, and/or machine a bevel on an outer surface of the end of the workpiece that is transverse to and at one or more angles, other than ninety-degrees, to the longitudinal extent of the workpiece. In still other examples, the template 104 may cause the cutting tip 108 to machine an edge having one or more angles into the workpiece. Different templates may be used and/or configured to achieve the desired operation. Additionally or alternatively, the radial advancement mechanism 106 may be locked to perform boring into the pipe 102 (e.g., only in the axial direction).

The example slide tool 100 has sufficiently high rigidity under load so that pressure between the cam follower 112 and the template 104 does not cause the cam follower 112 to be locked against the template 104 during cutting operations. For example, the high torque loads on the axial advancement mechanism 110 during cutting operations could, without sufficient stiffness and lubricity in the axial advancement mechanism 110, cause the cam follower 112 to be loaded against the template 104 to such a degree that axial movement would be prevented and/or the slide tool 100 could be damaged.

Figure 4:
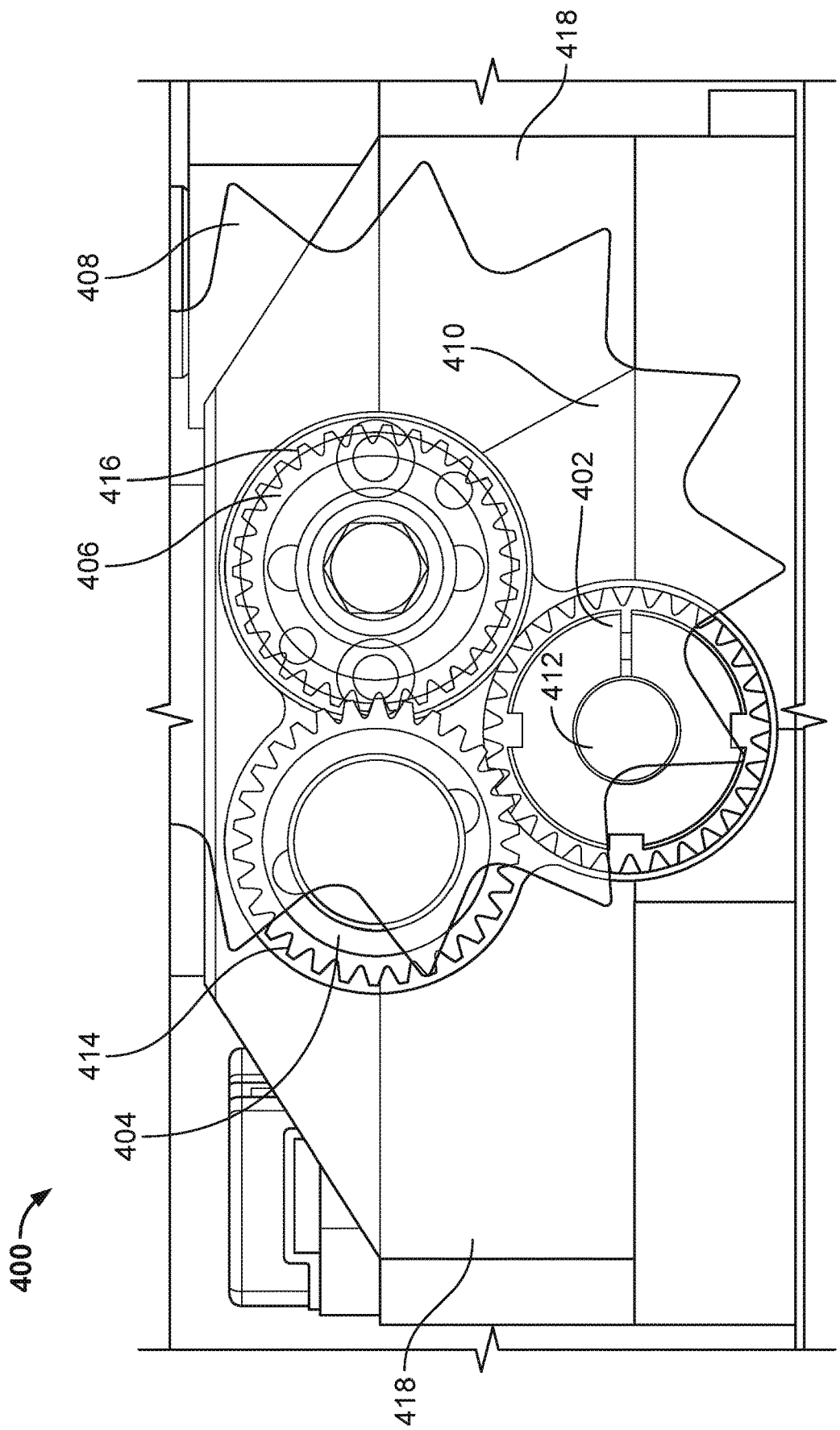
FIG. 4 is a view of a gear mechanism to provide bidirectional radial advancement for the example slide tool of FIG. 2.
Figure 5:
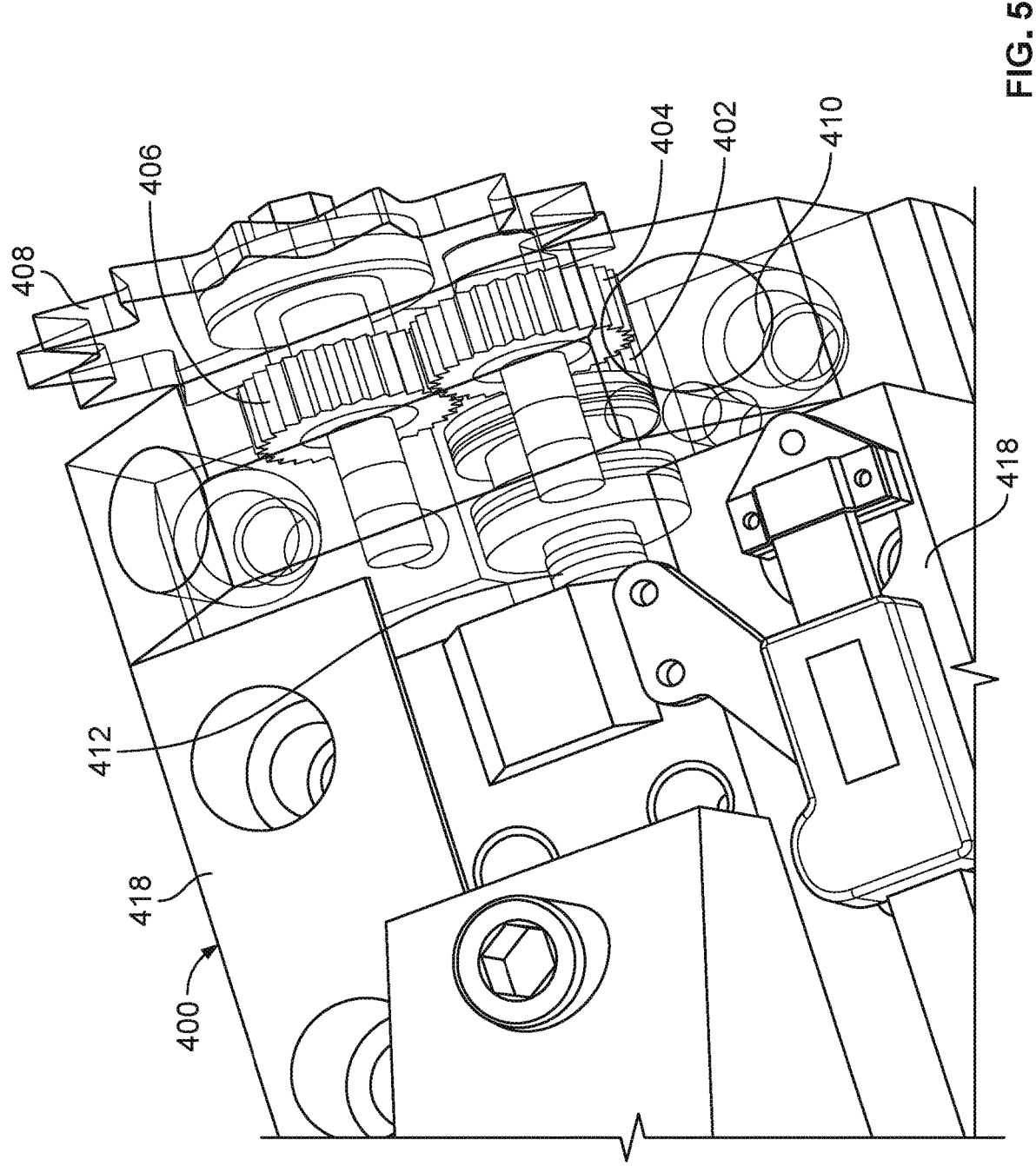
FIGS. 5 and 6 are perspective views of the example gear mechanism of FIG. 4.
Figure 6:
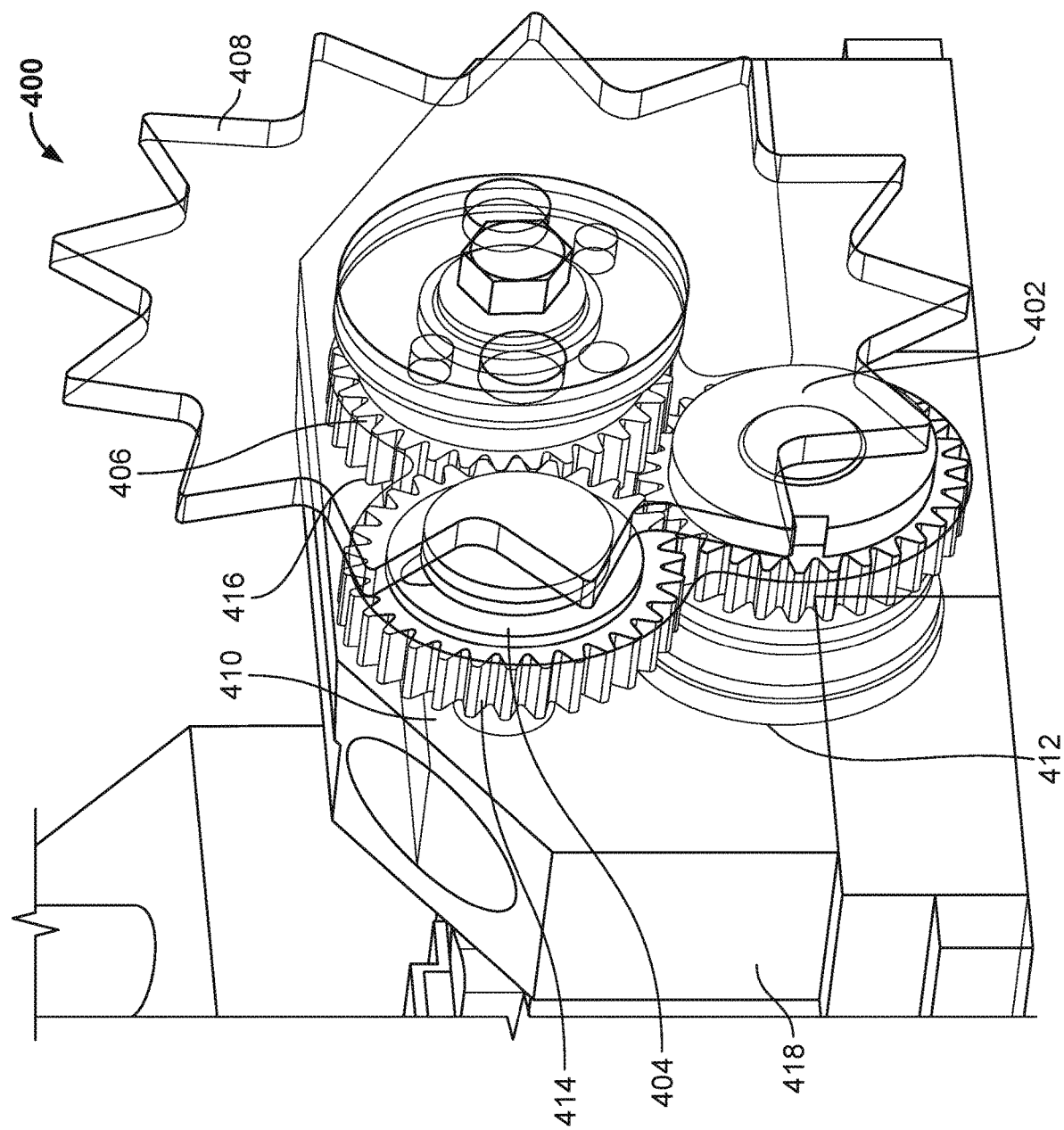
Figure 7:
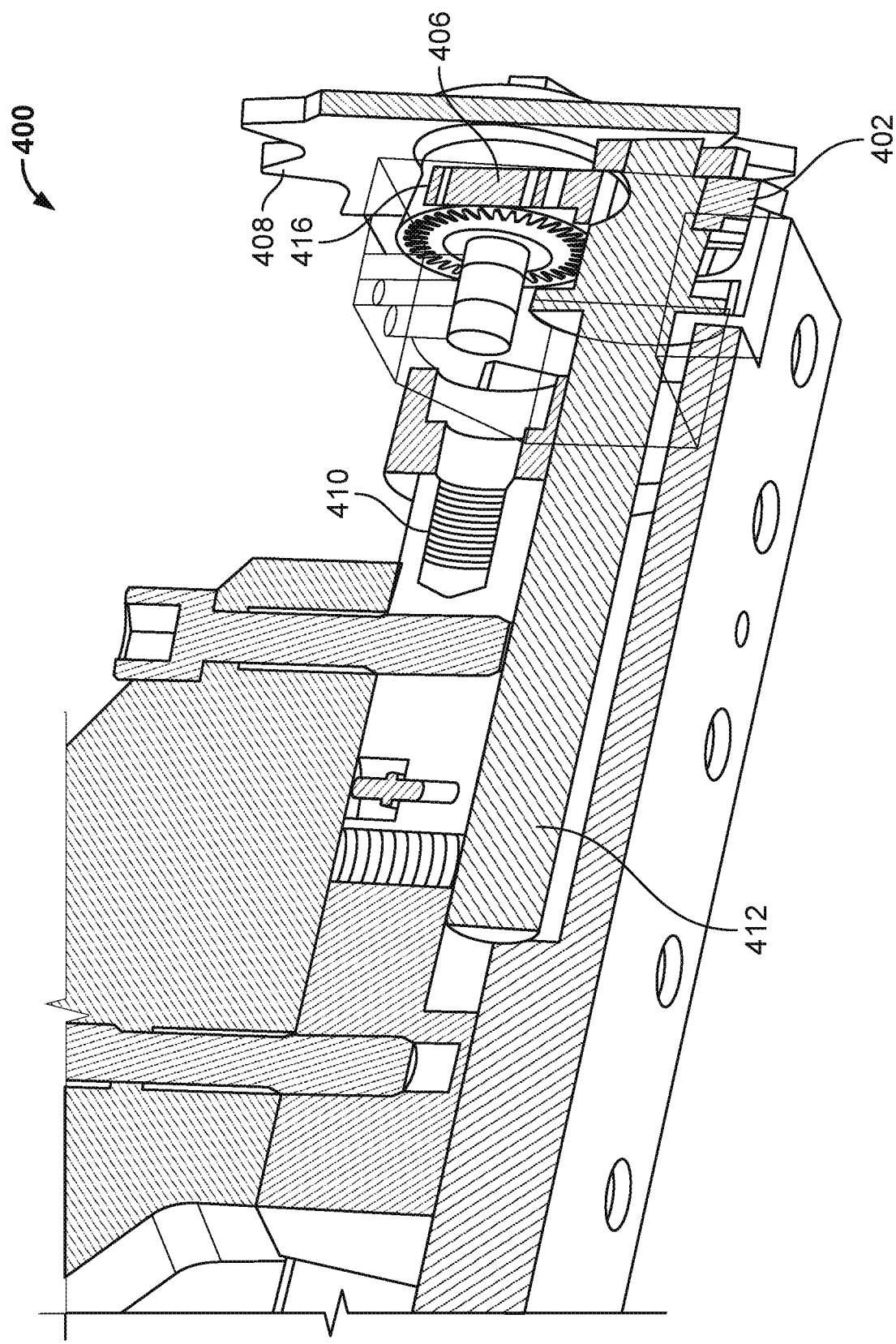
FIG. 7 is a section view of the gear mechanism of FIG. 4.

FIG. 4 is a view of a gear mechanism 400 to provide bidirectional radial advancement for the example slide tool of FIG. 2. FIGS. 5 and 6 are perspective views of the example gear mechanism 400 of FIG. 4. FIG. 7 is a section view of the gear mechanism 400 of FIG. 4. As illustrated in FIGS. 1 and 7, a slide base 114 is mounted to the radial slide 410.

The gear mechanism 400 is an implementation of the radial advancement mechanism 106. The gear mechanism 400 includes a stationary gear 402 and swappable gears 404, 406. The swappable gear 406 is coupled to a star wheel gear 408 that contacts and rotates in response to interfacing with the advancement points around the circumference of the frame 28. When the star wheel gear 408 contacts an advancement point, the star wheel gear 408 is rotated a fixed amount, thereby rotating the swappable gear 406 with the same angular rotation.

The stationary gear 402 is coupled to a radial slide 410 via a feed screw 412. A track 418 mounted to and/or integral to the frame 28 contains movement of the radial slide 410 to the radial direction, while the advancement of the radial slide 410 is controlled by turning the feed screw 412 and, thus, by turning the stationary gear 402.

The rotation of the swappable gear 406 rotates the stationary gear 402 in either direction, depending on which of two slots 414, 416 the swappable gear 406 is installed, to enable bidirectional automatic radial feeding. If the swappable gear 406 is installed in the slot 414, the swappable gear 406 has a direct coupling (e.g., direct contact) with the stationary gear 402, and rotation of the swappable gear 406 in the slot 414 rotates the stationary gear 402 in a first direction and advances the radial slide 410 in a first direction. Conversely, when the swappable gear 406 is installed in the slot 416, the swappable gear 406 is coupled to the stationary gear 402 via the swappable gear 404 and is in contact with to the stationary gear 402, which results in reversing the direction of rotation of the stationary gear 402 when the swappable gear 406 is turned in the same direction. Thus, the feed screw 412 is turned in a first direction to radially feed the radial slide 410 in a first radial direction when the swappable gears 406 are in a first configuration with respect to the slots 414, 416, and the feed screw 412 is turned in a second direction to radially feed the radial slide 410 in a second radial direction (e.g., opposite the first radial direction) when the swappable gears 406 are in a second configuration (e.g., opposite the first configuration) with respect to the slots 414, 416.

Figure 8:
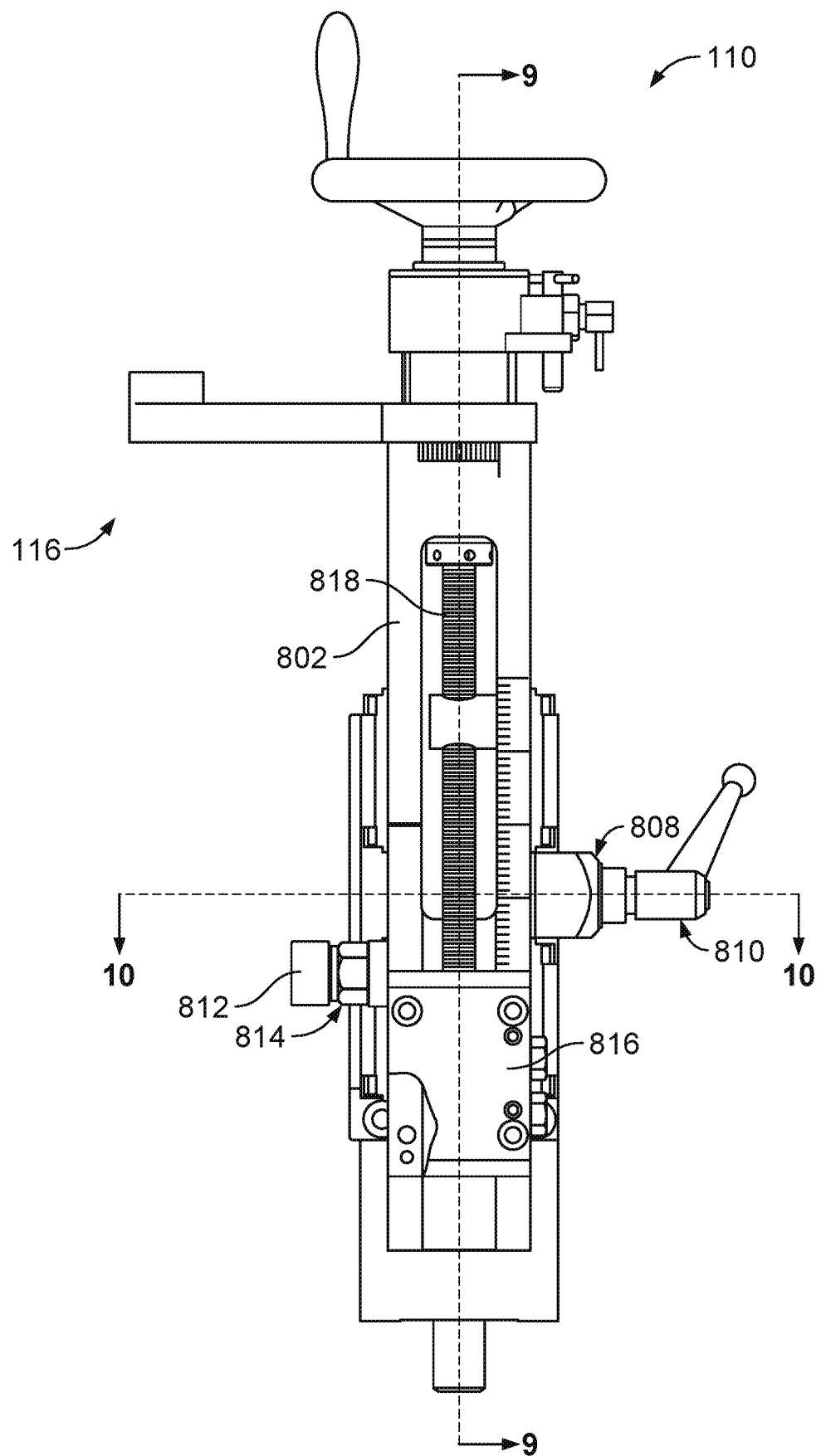
FIG. 8 is a view of an example implementation of the axial advancement mechanism of the slide tool of FIG. 2.
Figure 9:
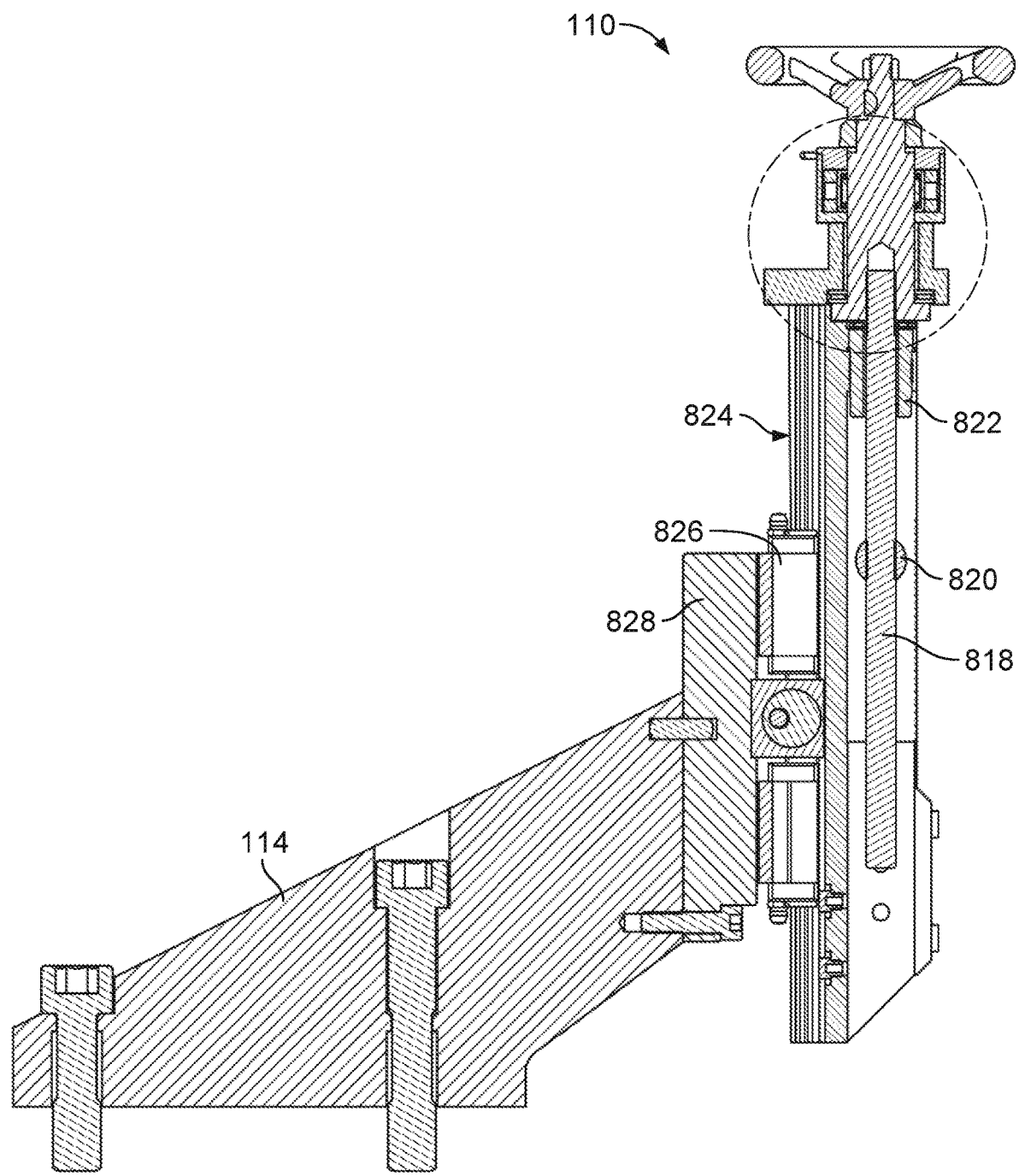
FIG. 9 is a section view of the axial advancement mechanism of FIG. 2 including a section view of the axial advancement mechanism of FIG. 8.

FIG. 8 is a view of an example implementation of the axial advancement mechanism 110 of the slide tool 100 of FIG. 2. FIG. 9 is a section view of the axial advancement mechanism 110 of FIG. 8 including a section view of the axial advancement mechanism 110. The axial advancement mechanism 110 is configured to hold the cutting tip 108 and to feed the cutting tip 108 in the axial direction via an outer axial slide 802 and an inner axial slide 804. While the example outer axial slide 802 has a rectangular cross section, in other examples the outer axial slide 802 is cylindrical or another appropriate shape. As shown in FIGS. 8 and 9, the axial advancement mechanism 110 includes a slide tensioning block 808, a slide tensioning handle 810, a cam follower 812, a cam bearing block 814, a tool holder retaining plate 816, a feed screw 818, a tool holder nut 820, tensioning nuts 822, a guide rail 824, a recirculating bearing carriage 826, and a slide block 828.

The cam bearing block 814 includes a bearing for the cam follower 812. The cam follower 812 is coupled to the guide rail 824 and the outer axial slide 802. The cam follower 812 translates radial advancement by the radial advancement mechanism 106 to axial advancement of the outer axial slide 802 based on a shape of the template 104. To slide in the axial direction, the outer axial slide 802 is coupled to the guide rail 824. The recirculating bearing carriage 826 slides along the guide rail 824. The slide block 828 attaches the recirculating bearing carriage 826 to the slide base 114.

Figure 10:
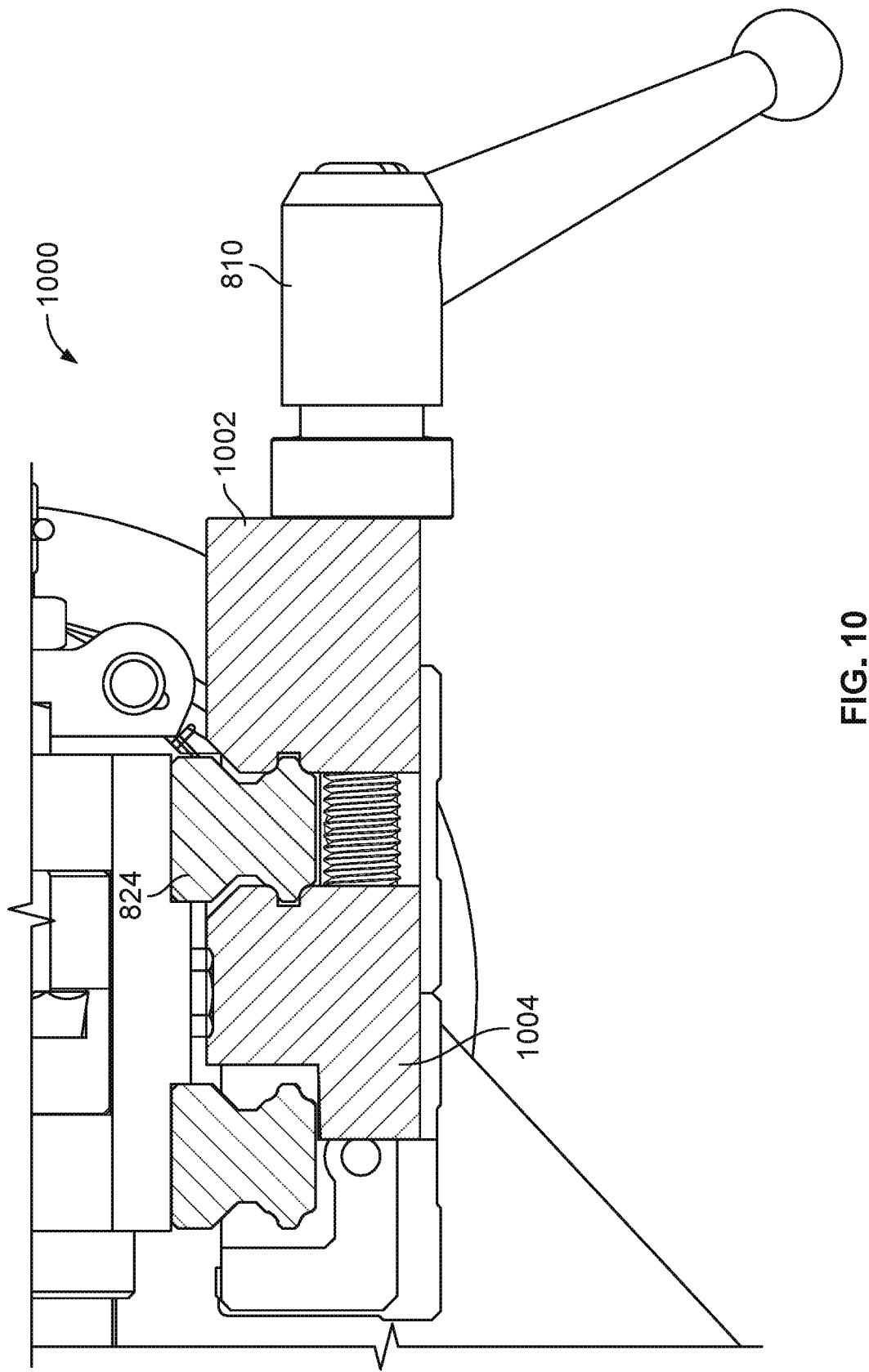
FIG. 10 is a section view of a rail lock and drag assembly including the example guide rail and the recirculating bearing carriage of FIG. 8.
Figure 11:
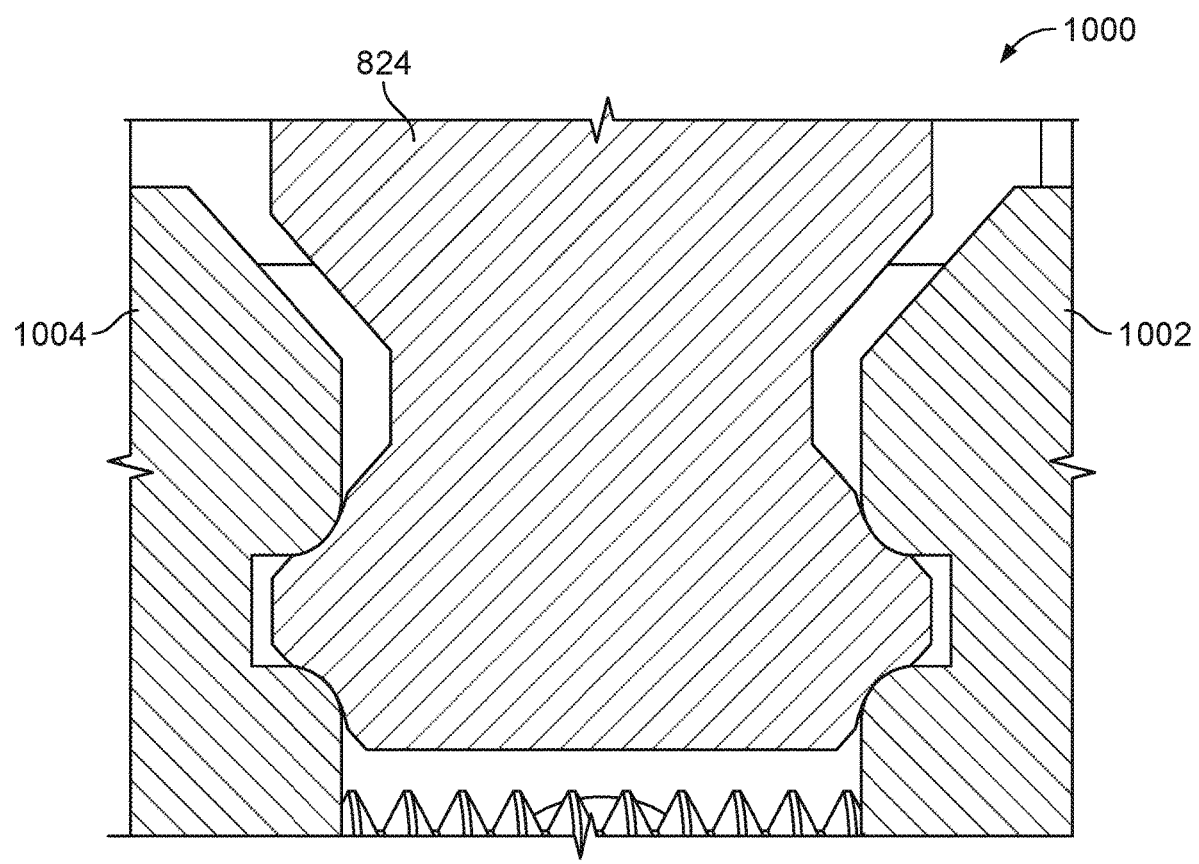
FIG. 11 is a more detailed section view of the rail lock and drag assembly of FIG. 10.
Figure 12:
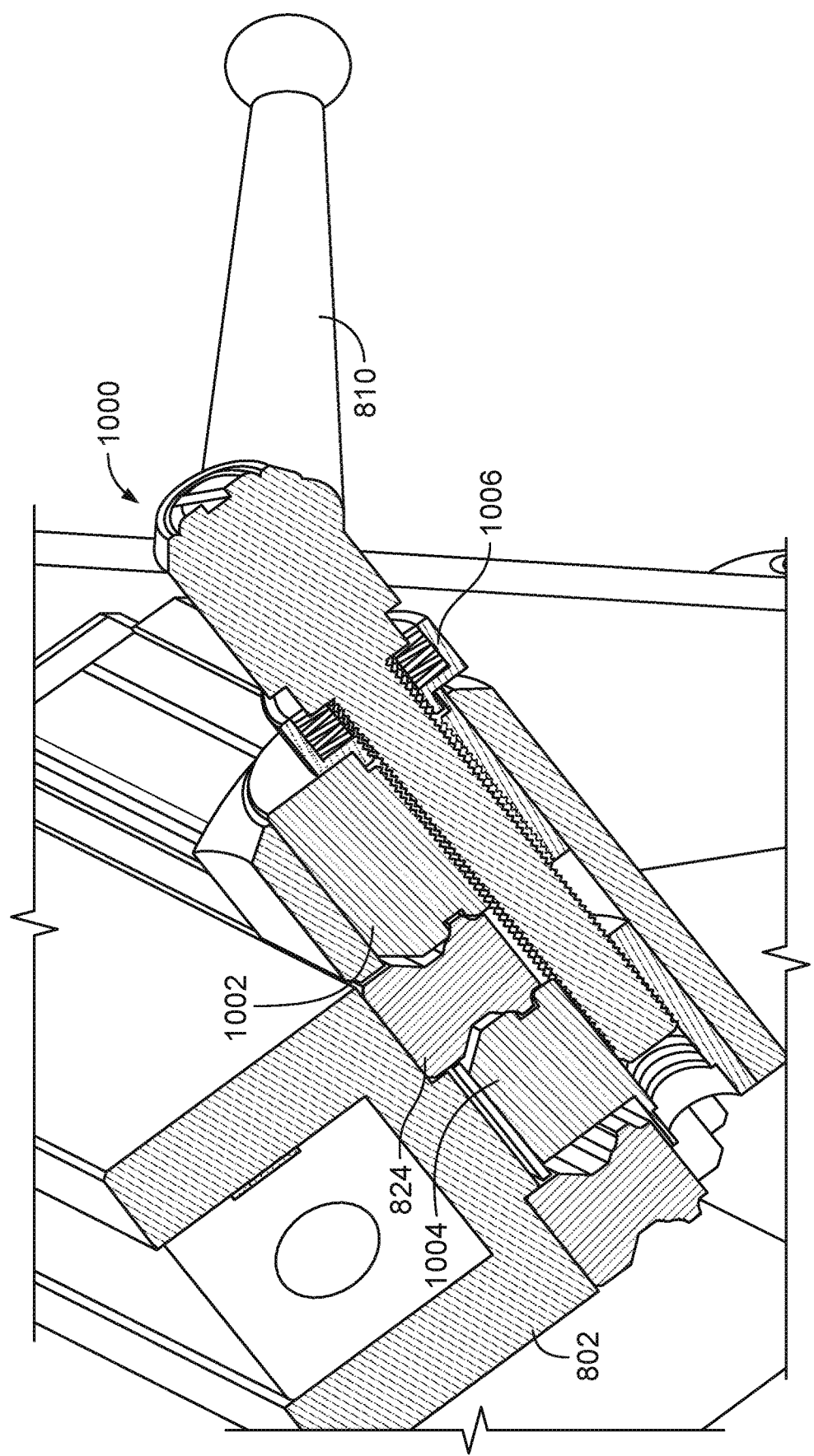
FIG. 12 is another section view of the example rail lock and drag assembly of FIG. 10.

FIG. 10 is a section view of a rail lock and drag assembly 1000 including the example guide rail 824 and the recirculating bearing carriage 826 of FIG. 9. FIG. 11 is a more detailed section view of the rail lock and drag assembly 1000 of FIG. 10. FIG. 12 is another section view of the example rail lock and drag assembly 1000 of FIG. 10.

As illustrated in FIG. 9, the recirculating bearing carriage 826 includes recirculating bearings to permit the recirculating bearing carriage 826 to slide along the guide rail 824. Example recirculating bearings include ball bearings and/or needle bearings (or other cylindrical bearings). The recirculating bearing carriage is capable of sliding along the guide rail 824 even under substantial torque that may be applied to the recirculating bearing carriage 826 during operation. While an example guide rail 824 is illustrated in FIGS. 9-12, other example guide rail profiles may be used that permit the use of recirculating bearing carriages may be used. For example, the guide rail may be cylindrical. The example rail lock and drag assembly 1000 includes the slide tensioning block 808, the slide tensioning handle 810, and tensioning blocks 1002, 1004. Example tensioning blocks 1002, 1004 are constructed using a bronze alloy to provide both high strength and high lubricity to enable sliding along the guide rail 824 under a cutting load (e.g., without locking). The slide tensioning block 808 includes one or more disc springs 1006 that cause the tensioning blocks 1002, 1004 to apply at least a threshold compression to the guide rail 824. Thus, the tensioning blocks 1002, 1004, the recirculating bearing carriage 826, and the guide rail 824 provide sufficient rigidity when using the cam follower 812 and the template 104 that the torque load on the outer axial slide 802 does not lock the cam follower 812 against the template 104. The rigidity permits the cam follower 812 to move freely within the template 104 in response to radial travel of the slide tool 100.

Additionally or alternatively, the slide tensioning block 808 may be locked against the guide rail 824 to configure the axial advancement mechanism 110 to advance the cutting tip 108 in the axial direction with respect to the workpiece via advancing the axial feed mechanism 116. The slide tensioning handle 810 may be tightened to lock the tensioning blocks 1002, 1004 against the guide rail 824 (e.g., to apply a sufficiently high compressive load to prevent movement between the recirculating bearing carriage 826 and the guide rail 824), to thereby lock the outer axial slide 802 against axial movement. Locking the slide tensioning handle 810 may be used to perform boring, cutting, and/or facing without the template 104.

Figure 13:
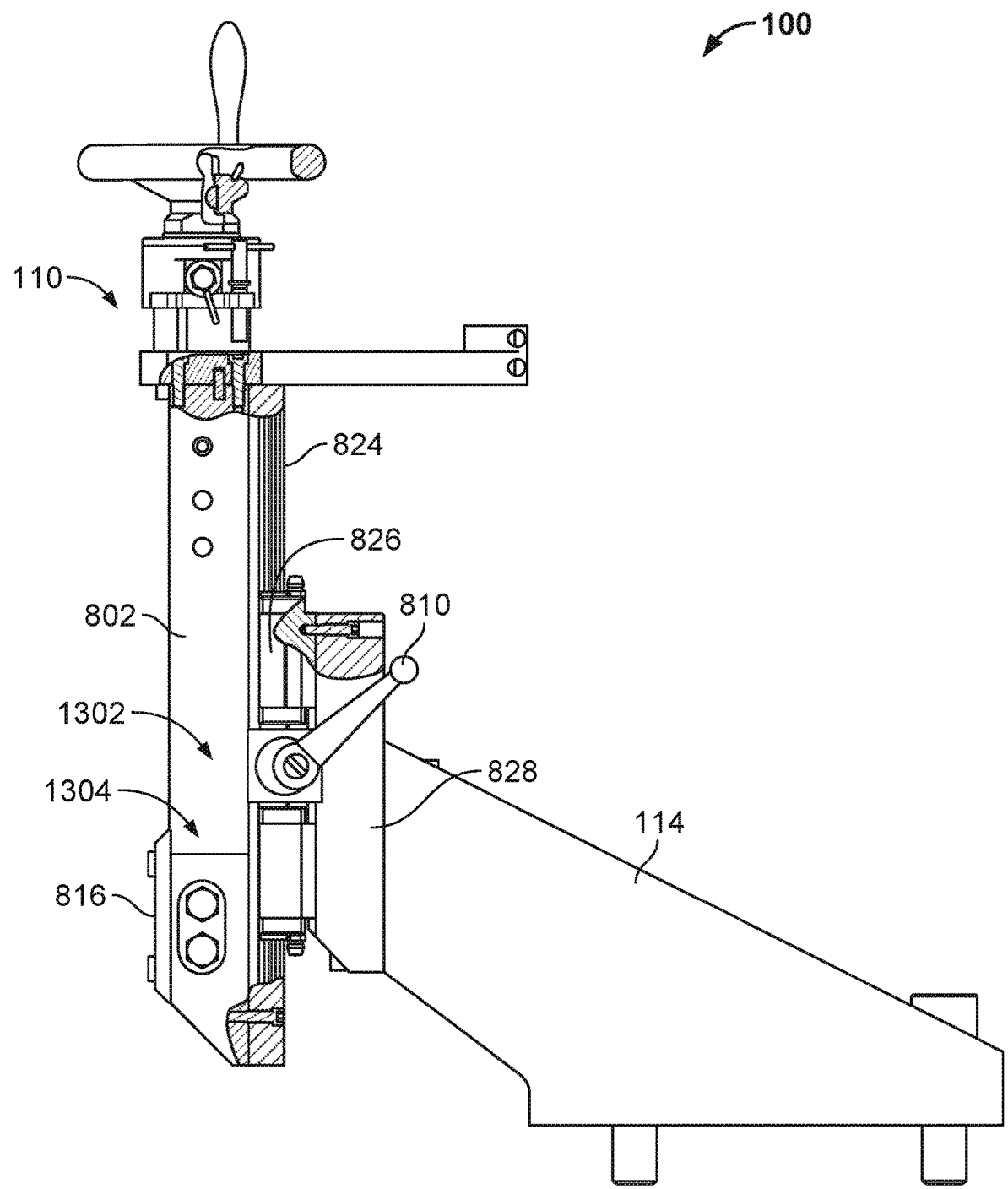
FIG. 13 is another view of the example axial advancement mechanism.
Figure 14:
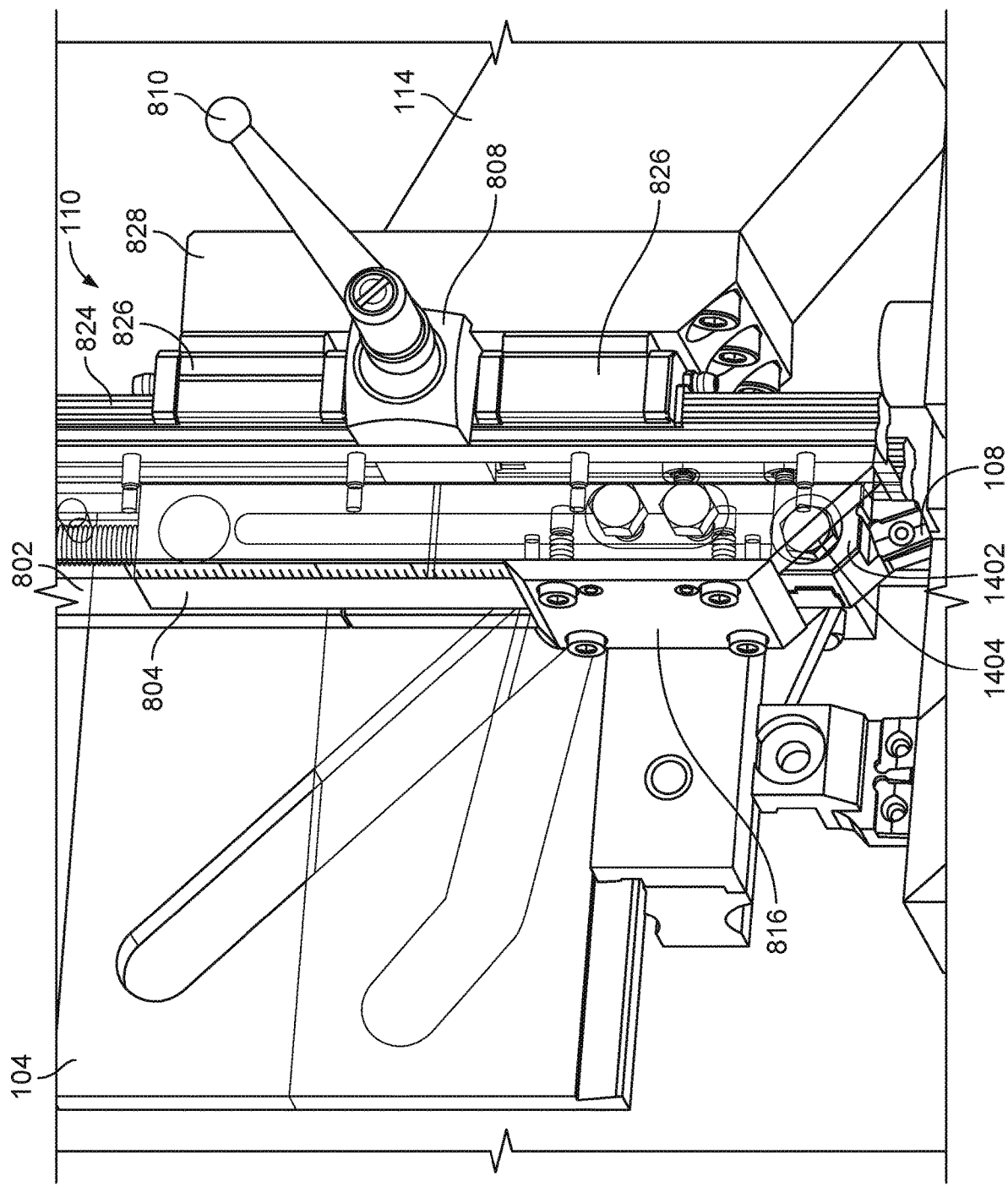
FIG. 14 is another view of the example cam follower of FIG. 8 a template holder including a template, the axial advancement mechanism, the rail lock and drag assembly, and cutting tool holder with a cutting insert.

FIG. 13 is another view of the example axial advancement mechanism 110 of FIG. 8. FIG. 14 is another view of the example cam follower of FIG. 8 and a template holder including a template. The example outer axial slide 802 may include markings 1302, 1304 to illustrate the range of axial travel of the outer axial slide 802. While a first distance between the markings 1302, 1304 is illustrated in FIG. 13, the example template 104, the cam follower 812, and the outer axial slide 802 may be adjusted to reset the outer axial slide 802 for further axial travel of the cutting tip 108 beyond the nominal axial range indicated by the markings 1302, 1304.

FIG. 14 also shows the cutting tip 108 installed in a cutting tip holder 1402, which is attached to the inner axial slide 804 by a bolt 1404 or other fastener.

Returning to FIGS. 2, 8, and 9, the inner axial slide 804 is advanced via the axial feed mechanism 116. The example axial feed mechanism 116 is used to axially feed the cutting tip 108 instead of using the template 104. The example axial feed mechanism 116 includes a feed component 118 and a feed actuation component 120. A feed cable 122 couples the feed component 118 to the feed actuation component 120 to perform actuation of the feed component 118. The feed actuation component 120 actuates the feed component 118 via the feed cable 122 by interaction between the feed actuation component 120 and one or more advancement points around the circumference of the frame 28, similar to the radial advancement mechanism 106. Actuation of the feed component 118 feeds the axial advancement mechanism 110. As described in more detail below, the direction of axial feeding may be configured by configuring the feed component 118.

Figure 15:
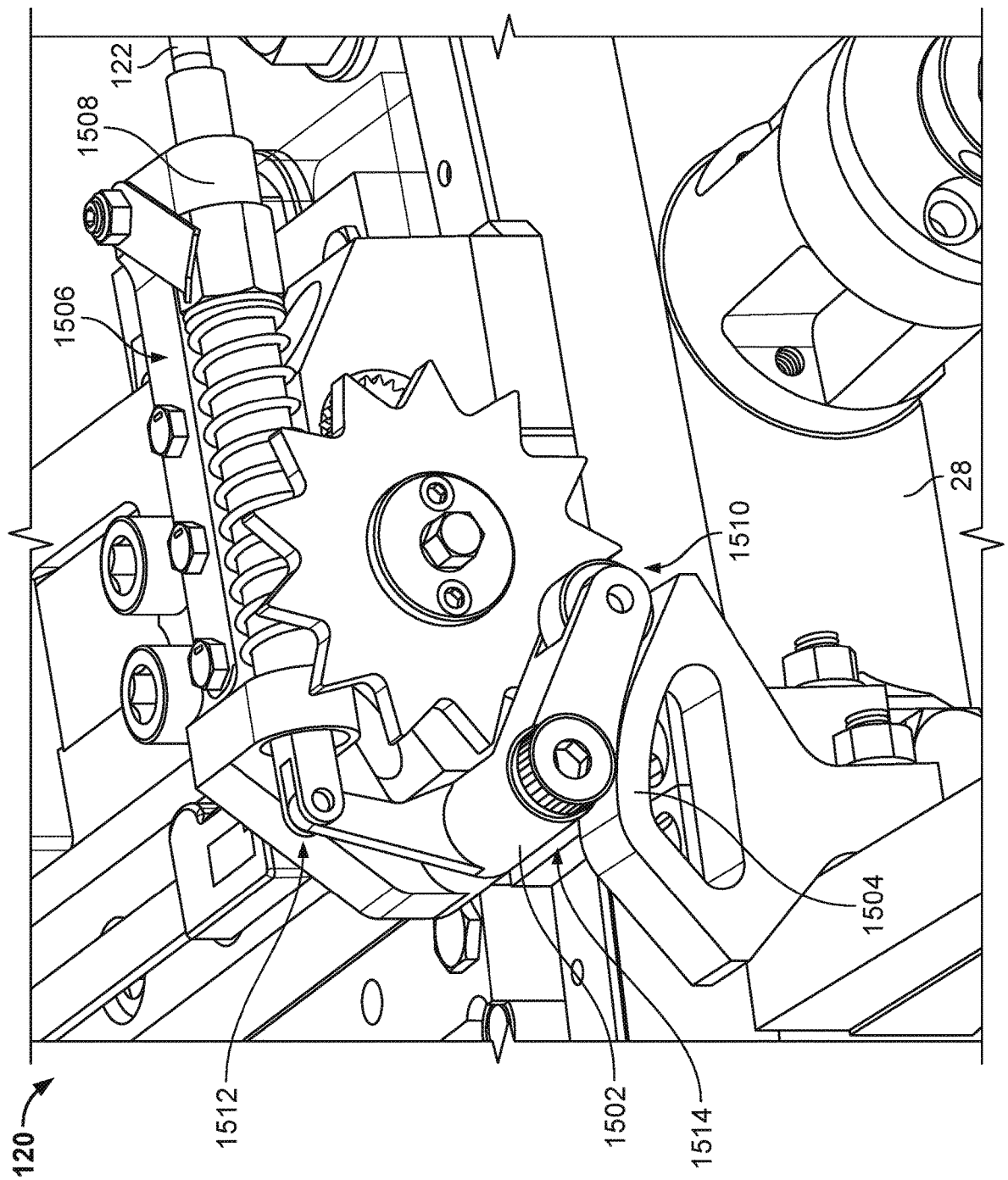
FIGS. 15 and 16 are views of an example implementation of the feed actuation component of FIG. 2.
Figure 16:
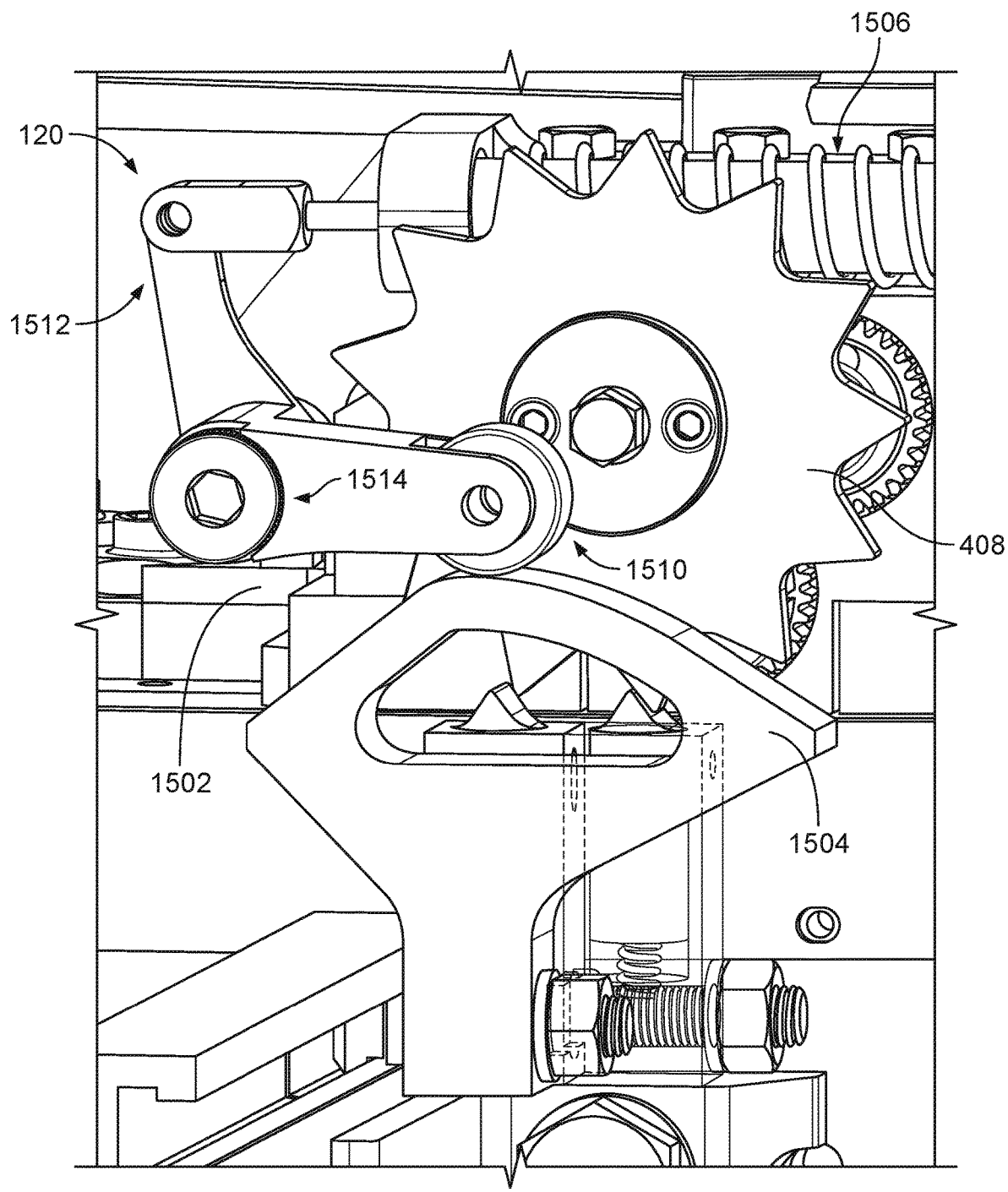

FIGS. 15 and 16 are views of an example implementation of the feed actuation component 120. The feed actuation component 120 includes a cam pivot arm 1502 configured to contact a stationary contact surface 1504 on the frame 28. The cam pivot arm 1502 is coupled to a spring-loaded cable pull 1506, which is coupled to the feed cable 122. The motion of the cam pivot arm 1502 over the stationary contact surface 1504 causes the cam pivot arm 1502 to pull the feed cable 122 via the spring-loaded cable pull 1506. A feed nut 1508 controls an inner cable position of the feed cable 122 relative to an outer cable sheath of the feed cable 122, which increases or decreases the length of inner cable between the cam pivot arm 1502 and the cam follower. When the feed nut 1508 is rotated, the start position of the cam follower to the cam is adjusted, which increases or decreases the feed stroke by the cam pivot arm 1502 at each interaction with the stationary contact surface 1504.

The cam pivot arm 1502 includes a contact end 1510 and a cable end 1512. The contact end 1510 is configured to contact and slide or roll over the stationary contact surface 1504. The cable end 1512 is coupled to the contact end 1510 by a pivot point 1514 such that the movement of the contact end 1510 causes corresponding movement of the cable end 1512, thereby pulling on the feed cable 122. In the example of FIGS. 15 and 16, as the cam pivot arm 1502 moves in the circumferential direction, the cam pivot arm 1502 contacts and the stationary contact surface 1504. The cam pivot arm 1502 rotates to travel over the stationary contact surface 1504, causing the cam pivot arm 1502 to rotate and, thus, pull on the cable end 1512 to pull on the feed cable 122. Different implementations of the cam pivot arm 1502 and stationary contact surface 1504 may be used.

As illustrated in FIG. 16, the stationary contact surface 1504 may be located proximate to the advancement points for the star wheel gear 408. Thus, the radial advancement mechanism 106 and the feed actuation component 120 may be located at substantially the same location(s) on the circumference of the frame 28.

Figure 17:
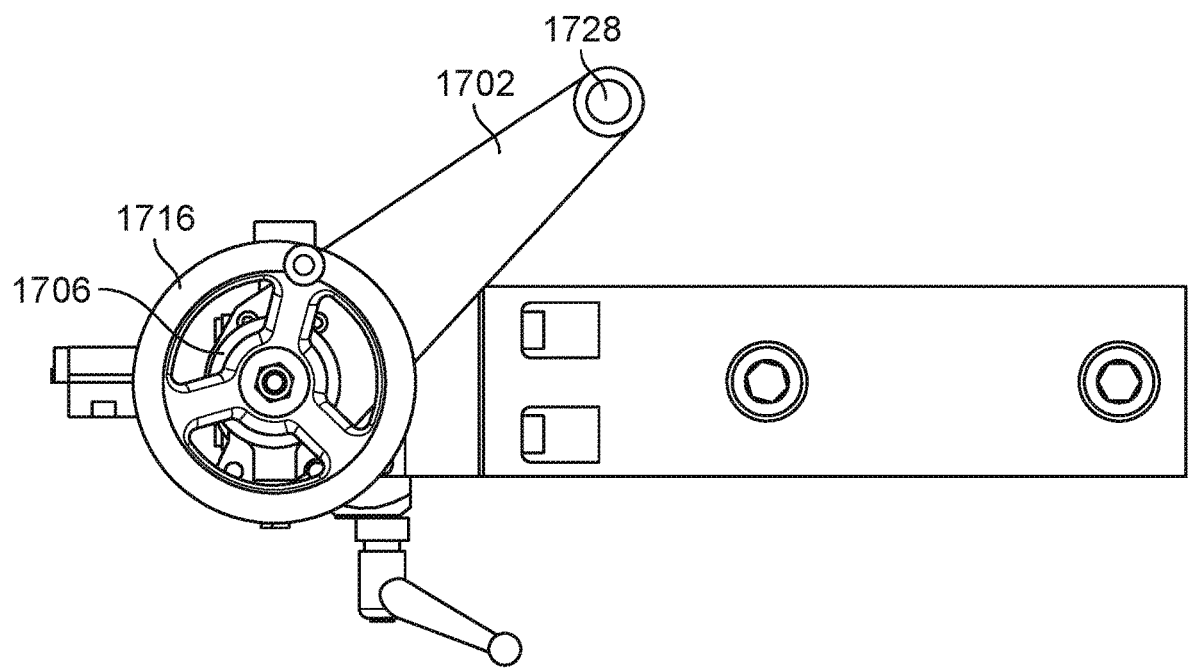
FIGS. 17 and 18 are views of the example feed component of FIG. 2.
Figure 18:
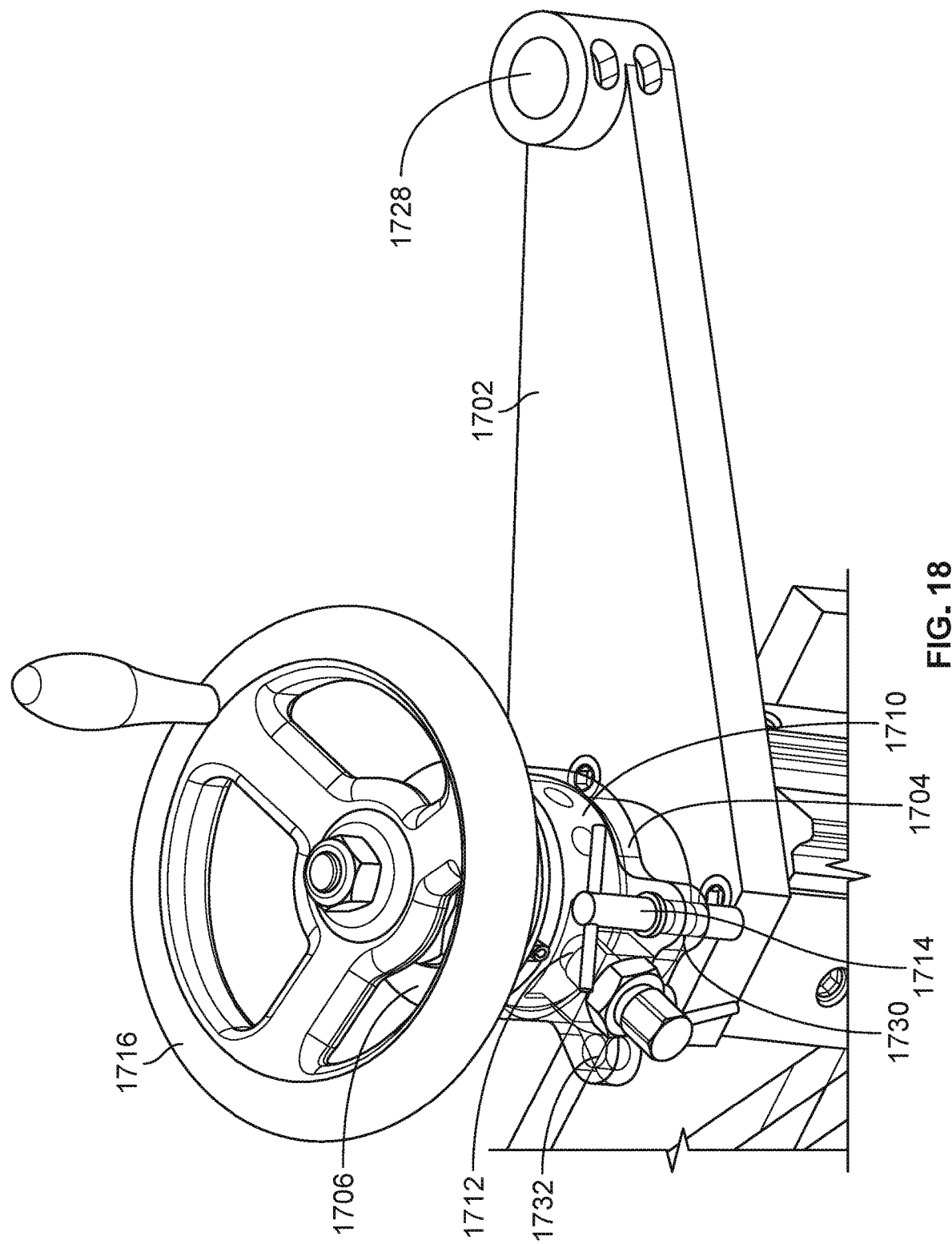
Figure 19:
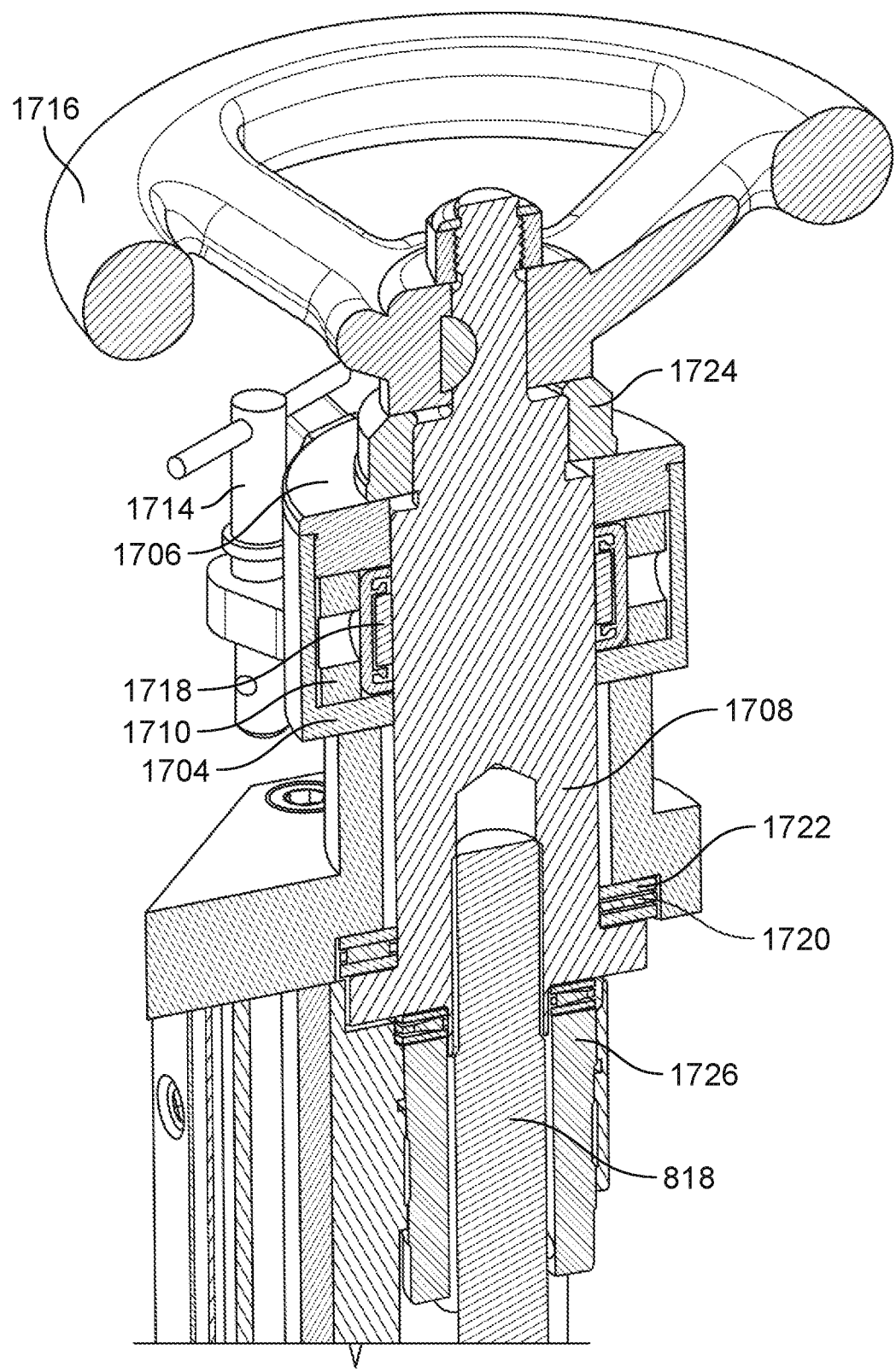
FIG. 19 is a section view of the example feed component of FIGS. 2 and 17.

FIGS. 17 and 18 are views of the example feed component 118. FIG. 19 is a section view of the example feed component 118. The feed component 118, when actuated by the feed cable 122, feeds the inner axial slide 804 by an incremental length, which may be adjusted via the feed actuation component 120. The feed component 118 can be configured to feed in either axial direction.

The example feed component 118 includes a feed top plate 1702, a radial feed clutch lever 1704, a radial feed lever bushing 1706, an axial feed screw 1708, a radial feed coupler ring 1710, a retractable pin 1712, a quick release pin 1714, a hand wheel 1716, a roller clutch bearing 1718, a needle thrust bearing 1720, a thrust washer bearing 1722, a clutch nut 1724, and a tensioning nut 1726.

The feed top plate 1702 includes an anchor slot 1728 into which an anchor tab 126 of the feed cable 122 is inserted to anchor the feed cable 122 to the feed top plate 1702. The quick release pin 1714 couples the feed cable 122 to the radial feed clutch lever 1704. The feed actuation component 120 pulls on the feed cable 122, and the anchor tab 126 and the anchor slot 1728 enable the feed cable 122 to exert a pulling force on the radial feed clutch lever 1704 relative to the feed top plate 1702.

The roller clutch bearing 1718 provides one-directional rotation and resists rotation in the opposite direction. The retractable pin 1712 engages the radial feed clutch lever 1704 to the roller clutch bearing 1718 via the radial feed coupler ring 1710. The retractable pin 1712 may be disengaged from the radial feed coupler ring 1710 to enable bidirectional adjustment of the axial feed screw 1708 via the hand wheel 1716.

The radial feed clutch lever 1704 includes two slots 1730, 1732 to which the feed cable 122 can be coupled via the quick release pin 1714. The first slot 1730 causes the feed cable 122 to advance the axial feed screw 1708 (and the inner axial slide 804 to which the axial feed screw 1708 is coupled) in a first feed direction. The second slot 1732 causes the feed cable 122 to advance the axial feed screw 1708 (and the inner axial slide 804) in a second direction. In addition to connecting the feed cable 122 to one of the two slots 1730, 1732 to configure the feed direction, changing the axial feed direction of the feed component 118 further includes accessing and flipping the direction of the roller clutch bearing 1718. For example, the hand wheel 1716, the clutch nut 1724, and the radial feed lever bushing 1706 are removable to access the roller clutch bearing 1718.

In some disclosed examples, all of the nuts have a same head size to enable manipulation of the nuts in the examples using a single wrench size. However, different nut head sizes may be used in other examples.

FIGS. 20A and 20B illustrate an example cutting template 2000 that may be used to implement the template 104 of FIG. 2. The example cutting template 2000 of FIGS. 20A and 20B includes one or more adjustable portions that permit adjustment of the template 2000 to form different profiles. The cutting tool 108 produces a profile (e.g., a beveled edge) on an outer diameter or inner diameter of the workpiece according to the profile of the template 2000.

The example cutting template 2000 includes a frame plate 2002 having an inner opening 2004, and one or more template links 2006, 2008 (e.g., two template links). The template links 2006, 2008 are engaged by the cam follower 112, which follows the template links 2006, 2008 in an axial direction 2010 as the cam follower 112 is advanced in a radial direction 2012 (as described above with reference to the template 104).

The first example template link 2006 is coupled to the frame plate 2002 at a first joint 2014, which may include a fastener 2016 (e.g., a nut and bolt). The example template link 2006 and the template link 2008 is also coupled to the frame plate 2002 at a center joint 2018. The second example template link 2008 is coupled to the frame plate 2002 at a third joint 2020, which may include a fastener 2022 (e.g., a nut and bolt). The first and second template links 2006, 2008, and the first and third joints 2014, 2020 are adjustable to modify a template path within the inner opening 2004 and are securable to fix the template path. In some examples, the inner opening 2004 is omitted.

The example first joint 2014 and the example third joint 2020 are slots or slip joints that enable sliding between the template links 2006, 2008 and the frame plate 2002. For example, the fasteners 2016, 2022 may be adjusted within the respective joints 2014, 2020. The fasteners 2016, 2022 may be tightened or otherwise secured to fix the first template link 2006 and/or the second template link 2008 at particular orientations. As the fastener 2016 is moved within the first joint 2014, the angle of the first template link 2006 changes. Similarly, as the fastener 2022 is moved within the third joint 2020, the angle of the second template link 2008 changes.

The example center joint 2018 is a fixed joint (e.g., not a slot), around which the template links 2006, 2008 pivot. The joints 2014, 2018, 2020 may be tightened or loosened to secure the first and second template links 2006, 2008 at desired angles. In the same manner as the template 104, the angles of the first and second template links 2006, 2008 determine the profile to be cut into the workpiece. However, the example adjustable template 2000 of FIGS. 20A and 20B enable a single template to implement multiple profiles, thereby reducing the number of templates that must be available to implement different cutting profiles.

The center joint 2018 includes a cam handle 2024 to enable rapid tightening and loosening of the template links 2006, 2008 at the center joint 2018. When tightened, the cam handle 2024 secures the template links 2006, 2008 to resist adjustment of the template links 2006, 2008 during a cutting operation (e.g., in cooperation with the joints 2014, 2020 which are also secured).

The example template links 2006, 2008 may be marked with angular marks 2026 to assist a user in defining a desired template path via the template links 2006, 2008. In the example of FIGS. 20A and 20B, angles marked "0" refer to a straight profile parallel with an outer diameter of the workpiece. By configuring the template links 2006, 2008, the template 2000 may cause the cutting tip 108 to machine, into the workpiece, a straight edge substantially perpendicular to a longitudinal extent of the workpiece. The template 2000 may alternatively may be configured to cause the cutting tip 108 to machine a bevel on an inner surface of an end of the workpiece that is transverse to and at one or more angles other than ninety-degrees, to the longitudinal extent of the workpiece, and/or machine a bevel on an outer surface of the end of the workpiece that is transverse to and at one or more angles, other than ninety-degrees, to the longitudinal extent of the workpiece. In still other examples, the template 2000 may be configured to cause the cutting tip 108 to machine an edge having one or more angles into the workpiece. Any or all of the profiles mentioned above may be accomplished with the same template 2000 in the field, ensuring that the appropriate profile is available to the operator.

FIG. 21 illustrates the example cutting template 2000 of FIGS. 20A and 20B installed on the example cutting tool 100 of FIG. 2. As illustrated in FIG. 21, the cam follower 812 contacts the template links 2006, 2008. As the radial advancement mechanism 106 advances the cutting tool 100 in the radial direction 2102, the cam follower 812 translates the radial movement into axial movement by the axial advancement mechanism 110 based on the configuration of the template links 2006, 2008. Depending on whether an outer diameter profile or an inner diameter profile is being cut, the cam follower 812 may travel along the template link 2006 and then the template link 2008, or in the opposite direction. In the illustrated example, the template links 2006, 2008 are set for particular angles by setting the joints 2014, 2020.

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A split frame pipe cutting tool, comprising:
   a frame comprising a plurality of segments, configured to encircle a workpiece when the segments are connected, and configured to provide circumferential advancement around the workpiece; and
   a slide tool configured to position a cutting edge in contact with the workpiece to performing cutting or boring on the workpiece, the slide tool comprising:
   a radial advancement mechanism configured to provide radial advancement of the cutting edge based on circumferential advancement of the slide tool by the frame;

a cutting template coupled to the radial advancement mechanism, the cutting template comprising:
a frame plate;
a first template link coupled to the frame at a first joint; and
a second template link coupled to the first template link at a second joint, the first and second template links and the first and second joints being adjustable to modify a template path and being securable to fix the template path; and
an axial advancement mechanism configured to advance the cutting edge in an axial direction with respect to the workpiece by translating radial advancement by the radial advancement mechanism to axial advancement based on the template path in the cutting template.

2. The split frame pipe cutting tool as defined in claim 1, wherein the second template link is coupled to the frame plate at a third joint.

3. The split frame pipe cutting tool as defined in claim 1, wherein the first joint is a slip joint configured to enable sliding between the first template link and the template frame.

4. The split frame pipe cutting tool as defined in claim 3, wherein the first joint further comprises a nut configured to secure the first joint against sliding.

5. The split frame pipe cutting tool as defined in claim 1, wherein the second joint is a slip joint configured to enable sliding between the second template link and the template frame.

6. The split frame pipe cutting tool as defined in claim 5, wherein the second joint further comprises a nut configured to secure the second joint against sliding.

7. The split frame pipe cutting tool as defined in claim 1, further comprising a second slide tool configured to position a second cutting edge in contact with the workpiece to performing cutting or boring on the workpiece, the second slide tool being positioned at a second position on the frame.

8. The split frame pipe cutting tool as defined in claim 1, wherein the first and second template links are coupled to the template frame at the second joint.

9. The split frame pipe cutting tool as defined in claim 1, further comprising a third template link coupled to the second template link and coupled to the template frame.

10. The split frame pipe cutting tool as defined in claim 1, wherein the template is configured to cause the cutting edge to machine, into the workpiece, a straight edge substantially perpendicular to a longitudinal extent of the workpiece.

11. The split frame pipe cutting tool as defined in claim 1, wherein the template is configured to cause the cutting edge to machine at least one of the following into the workpiece:
a bevel on an inner surface of an end of the workpiece that is transverse to and at one or more angles other than ninety-degrees, to the longitudinal extent of the workpiece; or
a bevel on an outer surface of the end of the workpiece that is transverse to and at one or more angles, other than ninety-degrees, to the longitudinal extent of the workpiece.

12. The split frame pipe cutting tool as defined in claim 1, wherein the template is configured to cause the cutting edge to machine an edge into the workpiece, the edge having one or more angles.

13. The split frame pipe cutting tool as defined in claim 1, wherein the axial advancement mechanism comprises a cam follower configured to contact the cutting template on the template path and to traverse the template path based on the radial advancement.

14. A cutting template comprising:
a frame plate;
a first template link coupled to the frame plate at a first joint and comprising a first surface defining a first portion of a template path, wherein the template path is configured to guide a cam follower along the template path;
a second template link coupled to the first template link at a second joint and comprising a second surface defining a second portion of the template path, wherein the first and second template links are coupled to the template frame at the second joint, the first and second template links and the first and second joints being adjustable to modify the template path by adjusting at least an angle between the first and second portions of the template path, and wherein the first and second template links are securable to the frame plate to fix the template path.

15. The cutting template as defined in claim 14, wherein the first joint is a slip joint configured to enable sliding between the first template link and the template frame.

16. The cutting template as defined in claim 15, wherein the first joint further comprises a nut configured to secure the first joint against sliding.

17. The cutting template as defined in claim 14, wherein the second joint is a slip joint configured to enable sliding between the second template link and the template frame.

18. The cutting template as defined in claim 14, wherein the first and second template links are coupled to the template frame at the second joint.

19. The cutting template as defined in claim 14, wherein the second joint comprises a cam handle configured to selectively tighten or loosen the second joint.

20. The cutting template as defined in claim 14, further comprising a third template link coupled to the second template link and coupled to the template frame.

* * * * *